(12) United States Patent
Nemiroff (10) Patent No.: US 7,843,489 B2
(45) Date of Patent: Nov. 30, 2010

(54) MAINTAINING CONTINUOUS FILM MODE WITH BAD EDITS

(75) Inventor: Robert S. Nemiroff, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 1367 days.

(21) Appl. No.: 10/639,952

(22) Filed: Aug. 12, 2003

(65) Prior Publication Data
US 2005/0041099 A1 Feb. 24, 2005

(51) Int. Cl.
*H04N 5/253* (2006.01)
(52) U.S. Cl. .................................................. 348/96
(58) Field of Classification Search .................. None
See application file for complete search history.

(56) References Cited

U.S. PATENT DOCUMENTS

| 5,734,420 | A | | 3/1998 | Lee et al. |
| 5,929,902 | A | | 7/1999 | Kwok |
| 6,137,834 | A | * | 10/2000 | Wine et al. .................. 375/240 |
| 6,529,550 | B2 | * | 3/2003 | Tahara et al. ................ 375/240 |
| 6,584,273 | B1 | * | 6/2003 | Ashley et al. ................. 386/52 |
| 6,871,003 | B1 | * | 3/2005 | Phillips et al. ............... 386/55 |
| 2002/0018640 | A1 | * | 2/2002 | Bolduc ........................ 386/52 |
| 2002/0080875 | A1 | * | 6/2002 | Tahara et al. .......... 375/240.02 |
| 2003/0081677 | A1 | * | 5/2003 | Segman ................ 375/240.13 |
| 2004/0057696 | A1 | * | 3/2004 | Peters et al. .................. 386/52 |
| 2004/0071211 | A1 | * | 4/2004 | Washino ............... 375/240.01 |

* cited by examiner

*Primary Examiner*—Nhon T Diep
(74) *Attorney, Agent, or Firm*—Larry T. Cullen (57) ABSTRACT

A method for editing spliced-together video comprising a cut-out sequence followed by a cut-in sequence, both being in 3:2 pull-down format. A bad edit is detected, and either a number of contiguous frames at the end of the cut-out sequence and/or a number of contiguous frames at the beginning of the cut-in sequence are deleted in order that the 3:2 pull-down sequence is preserved in the spliced-together video. Alternatively, a first number of frames at the end of the cut-out sequence and/or a second number of frames at the beginning of the cut-in sequence are copied/renamed and inserted from other fields in order that the pull-down format is preserved in the spliced-together video.

21 Claims, 5 Drawing Sheets

|    | A  | B  | C  | D  | E  | F  | G  | H  | I  | J  | K  | L  | M del frms |
|----|----|----|----|----|----|----|----|----|----|----|----|----|----|
| 1  | Do | De | Ao | Ae | Bo | Be | Bo | Be | Bo | Ce | Co | De | 1 |
| 2  | Ao | Ae | Bo | Be | Bo | Ce | Bo | Be | Bo | Ce | Co | De | 2 |
| 3  | Bo | Be | Bo | Ce | Co | De | Bo | Be | Bo | Ce | Co | De | 3 |
| 4  | Bo | Ce | Co | De | Do | De | Bo | Be | Bo | Ce | Co | De | 4 |
| 5  | Co | De | Do | De | Ao | Ae | Bo | Be | Bo | Ce | Co | De | 0 |
| 6  | Do | De | Ao | Ae | Bo | Be | Bo | Ce | Co | De | Do | De | 5 |
| 7  | Ao | Ae | Bo | Be | Bo | Ce | Bo | Ce | Co | De | Do | De | 1 |
| 8  | Bo | Be | Bo | Ce | Co | De | Bo | Ce | Co | De | Do | De | 2 |
| 9  | Bo | Ce | Co | De | Do | De | Bo | Ce | Co | De | Do | De | 3 |
| 10 | Co | De | Do | De | Ao | Ae | Bo | Ce | Co | De | Do | De | 4 |
| 11 | Do | De | Ao | Ae | Bo | Be | Co | De | Do | De | Ao | Ae | 4 |
| 12 | Ao | Ae | Bo | Be | Bo | Ce | Co | De | Do | De | Ao | Ae | 5 |
| 13 | Bo | Be | Bo | Ce | Co | De | Co | De | Do | De | Ao | Ae | 1 |
| 14 | Bo | Ce | Co | De | Do | De | Co | De | Do | De | Ao | Ae | 2 |
| 15 | Co | De | Do | De | Ao | Ae | Co | De | Do | De | Ao | Ae | 3 |
| 16 | Do | De | Ao | Ae | Bo | Be | Do | De | Ao | Ae | Bo | Be | 3 |
| 17 | Ao | Ae | Bo | Be | Bo | Ce | Do | De | Ao | Ae | Bo | Be | 4 |
| 18 | Bo | Be | Bo | Ce | Co | De | Do | De | Ao | Ae | Bo | Be | 5 |
| 19 | Bo | Ce | Co | De | Do | De | Do | De | Ao | Ae | Bo | Be | 1 |
| 20 | Co | De | Do | De | Ao | Ae | Do | De | Ao | Ae | Bo | Be | 2 |
| 21 | Do | De | Ao | Ae | Bo | Be | Ao | Ae | Bo | Be | Bo | Ce | 2 |
| 22 | Ao | Ae | Bo | Be | Bo | Ce | Ao | Ae | Bo | Be | Bo | Ce | 3 |
| 23 | Bo | Be | Bo | Ce | Co | De | Ao | Ae | Bo | Be | Bo | Ce | 4 |
| 24 | Bo | Ce | Co | De | Do | De | Ao | Ae | Bo | Be | Bo | Ce | 0 |
| 25 | Co | De | Do | De | Ao | Ae | Ao | Ae | Bo | Be | Bo | Ce | 1 |

|    | A  | B  | C  | D  | E  | F  | G  | H  | I  | J  | K  | L  | M del frms |
|----|----|----|----|----|----|----|----|----|----|----|----|----|---|
| 1  | Do | De | Ao | Ae | Bo | Be | Bo | Be | Bo | Ce | Co | De | 1 |
| 2  | Ao | Ae | Bo | Be | Bo | Ce | Bo | Be | Bo | Ce | Co | De | 2 |
| 3  | Bo | Be | Bo | Ce | Co | De | Bo | Be | Bo | Ce | Co | De | 3 |
| 4  | Bo | Ce | Co | De | Do | De | Bo | Be | Bo | Ce | Co | De | 4 |
| 5  | Co | De | Do | De | Ao | Ae | Bo | Be | Bo | Ce | Co | De | 0 |
| 6  | Do | De | Ao | Ae | Bo | Be | Bo | Ce | Co | De | Do | De | 5 |
| 7  | Ao | Ae | Bo | Be | Bo | Ce | Bo | Ce | Co | De | Do | De | 1 |
| 8  | Bo | Be | Bo | Ce | Co | De | Bo | Ce | Co | De | Do | De | 2 |
| 9  | Bo | Ce | Co | De | Do | De | Bo | Ce | Co | De | Do | De | 3 |
| 10 | Co | De | Do | De | Ao | Ae | Bo | Ce | Co | De | Do | De | 4 |
| 11 | Do | De | Ao | Ae | Bo | Be | Co | De | Do | De | Ao | Ae | 4 |
| 12 | Ao | Ae | Bo | Be | Bo | Ce | Co | De | Do | De | Ao | Ae | 5 |
| 13 | Bo | Be | Bo | Ce | Co | De | Co | De | Do | De | Ao | Ae | 1 |
| 14 | Bo | Ce | Co | De | Do | De | Co | De | Do | De | Ao | Ae | 2 |
| 15 | Co | De | Do | De | Ao | Ae | Co | De | Do | De | Ao | Ae | 3 |
| 16 | Do | De | Ao | Ae | Bo | Be | Do | De | Ao | Ae | Bo | Be | 3 |
| 17 | Ao | Ae | Bo | Be | Bo | Ce | Do | De | Ao | Ae | Bo | Be | 4 |
| 18 | Bo | Be | Bo | Ce | Co | De | Do | De | Ao | Ae | Bo | Be | 5 |
| 19 | Bo | Ce | Co | De | Do | De | Do | De | Ao | Ae | Bo | Be | 1 |
| 20 | Co | De | Do | De | Ao | Ae | Do | De | Ao | Ae | Bo | Be | 2 |
| 21 | Do | De | Ao | Ae | Bo | Be | Ao | Ae | Bo | Be | Bo | Ce | 2 |
| 22 | Ao | Ae | Bo | Be | Bo | Ce | Ao | Ae | Bo | Be | Bo | Ce | 3 |
| 23 | Bo | Be | Bo | Ce | Co | De | Ao | Ae | Bo | Be | Bo | Ce | 4 |
| 24 | Bo | Ce | Co | De | Do | De | Ao | Ae | Bo | Be | Bo | Ce | 0 |
| 25 | Co | De | Do | De | Ao | Ae | Ao | Ae | Bo | Be | Bo | Ce | 1 |

Figure 3A

|    | Q  | R  | S  | T  | U  | V  | W  | X  | Y  | Z  | AA | AB | AC | AD | AE | AF | AG | AH | AI add frms |
|----|----|----|----|----|----|----|----|----|----|----|----|----|----|----|----|----|----|----|----|
| 1  | Do | De | Ao | Ae | Bo | Be | Bo | Ce | Co | De | Do | De | Ao | Ae | Bo | Be | Bo | Ce | 4 |
| 2  | Ao | Ae | Bo | Be | Bo | Ce | Co | De | Do | De | Ao | Ae | Bo | Be | Bo | Ce | Co | De | 3 |
| 3  | Bo | Be | Bo | Ce | Co | De | Do | De | Ao | Ae | Bo | Be | Bo | Ce | Co | De | Do | De | 2 |
| 4  | Bo | Ce | Co | De | Do | De | Ao | Ae | Bo | Be | Bo | Ce | Co | De | Do | De | Ao | Ae | 1 |
| 5  | Co | De | Do | De | Ao | Ae | Bo | Be | Bo | Ce | Co | De | Do | De | Ao | Ae | Bo | Be | 0 |
| 6  | Do | De | Ao | Ae | Bo | Be | Bo | Ce | Co | De | Do | De | Ao | Ae | Bo | Be | Bo | Ce | 0 |
| 7  | Ao | Ae | Bo | Be | Bo | Ce | Co | De | Do | De | Ao | Ae | Bo | Be | Bo | Ce | Co | De | 4 |
| 8  | Bo | Be | Bo | Ce | Co | De | Do | De | Ao | Ae | Bo | Be | Bo | Ce | Co | De | Do | De | 3 |
| 9  | Bo | Ce | Co | De | Do | De | Ao | Ae | Bo | Be | Bo | Ce | Co | De | Do | De | Ao | Ae | 2 |
| 10 | Co | De | Do | De | Ao | Ae | Bo | Be | Bo | Ce | Co | De | Do | De | Ao | Ae | Bo | Be | 1 |
| 11 | Do | De | Ao | Ae | Bo | Be | Bo | Ce | Co | De | Do | De | Ao | Ae | Bo | Be | Bo | Ce | 0 |
| 12 | Ao | Ae | Bo | Be | Bo | Ce | Co | De | Do | De | Ao | Ae | Bo | Be | Bo | Ce | Co | De | 0 |
| 13 | Bo | Be | Bo | Ce | Co | De | Do | De | Ao | Ae | Bo | Be | Bo | Ce | Co | De | Do | De | 4 |
| 14 | Bo | Ce | Co | De | Do | De | Ao | Ae | Bo | Be | Bo | Ce | Co | De | Do | De | Ao | Ae | 3 |
| 15 | Co | De | Do | De | Ao | Ae | Bo | Be | Bo | Ce | Co | De | Do | De | Ao | Ae | Bo | Be | 2 |
| 16 | Do | De | Ao | Ae | Bo | Be | Bo | Ce | Co | De | Do | De | Ao | Ae | Bo | Be | Bo | Ce | 2 |
| 17 | Ao | Ae | Bo | Be | Bo | Ce | Co | De | Do | De | Ao | Ae | Bo | Be | Bo | Ce | Co | De | 1 |
| 18 | Bo | Be | Bo | Ce | Co | De | Do | De | Ao | Ae | Bo | Be | Bo | Ce | Co | De | Do | De | 0 |
| 19 | Bo | Ce | Co | De | Do | De | Ao | Ae | Bo | Be | Bo | Ce | Co | De | Do | De | Ao | Ae | 4 |
| 20 | Co | De | Do | De | Ao | Ae | Bo | Be | Bo | Ce | Co | De | Do | De | Ao | Ae | Bo | Be | 3 |
| 21 | Do | De | Ao | Ae | Bo | Be | Bo | Ce | Co | De | Do | De | Ao | Ae | Bo | Be | Bo | Ce | 3 |
| 22 | Ao | Ae | Bo | Be | Bo | Ce | Co | De | Do | De | Ao | Ae | Bo | Be | Bo | Ce | Co | De | 2 |
| 23 | Bo | Be | Bo | Ce | Co | De | Do | De | Ao | Ae | Bo | Be | Bo | Ce | Co | De | Do | De | 1 |
| 24 | Bo | Ce | Co | De | Do | De | Ao | Ae | Bo | Be | Bo | Ce | Co | De | Do | De | Ao | Ae | 0 |
| 25 | Co | De | Do | De | Ao | Ae | Bo | Be | Bo | Ce | Co | De | Do | De | Ao | Ae | Bo | Be | 4 |

Figure 3B

|    | A  | B  | C  | D  | E  | F  | G  | H  | I  | J  | K  | L  | M  | N  | O del frms |
|----|----|----|----|----|----|----|----|----|----|----|----|----|----|----|-----|
| 1  | Co | De | Do | De | Ao | Ae | Bo | Be | Bo | Ce | Co | De | Do | De | 5 |
| 2  | Do | De | Ao | Ae | Bo | Be | Bo | Be | Bo | Ce | Co | De | Do | De | 1 |
| 3  | Ao | Ae | Bo | Be | Bo | Ce | Co | Be | Bo | Ce | Co | De | Do | De | 2 |
| 4  | Bo | Be | Bo | Ce | Co | De | Do | Be | Bo | Ce | Co | De | Do | De | 3 |
| 5  | Bo | Ce | Co | De | Do | De | Ao | Be | Bo | Ce | Co | De | Do | De | 4 |
| 6  | Co | De | Do | De | Ao | Ae | Bo | Ce | Co | De | Do | De | Ao | Ae | 4 |
| 7  | Do | De | Ao | Ae | Bo | Be | Bo | Ce | Co | De | Do | De | Ao | Ae | 0 |
| 8  | Ao | Ae | Bo | Be | Bo | Ce | Co | Ce | Co | De | Do | De | Ao | Ae | 1 |
| 9  | Bo | Be | Bo | Ce | Co | De | Do | Ce | Co | De | Do | De | Ao | Ae | 2 |
| 10 | Bo | Ce | Co | De | Do | De | Ao | Ce | Co | De | Do | De | Ao | Ae | 3 |
| 11 | Co | De | Do | De | Ao | Ae | Bo | De | Do | De | Ao | Ae | Bo | Be | 3 |
| 12 | Do | De | Ao | Ae | Bo | Be | Bo | De | Do | De | Ao | Ae | Bo | Be | 4 |
| 13 | Ao | Ae | Bo | Be | Bo | Ce | Co | De | Do | De | Ao | Ae | Bo | Be | 0 |
| 14 | Bo | Be | Bo | Ce | Co | De | Do | De | Do | De | Ao | Ae | Bo | Be | 1 |
| 15 | Bo | Ce | Co | De | Do | De | Ao | De | Do | De | Ao | Ae | Bo | Be | 2 |
| 16 | Co | De | Do | De | Ao | Ae | Bo | De | Ao | Ae | Bo | Be | Bo | Ce | 2 |
| 17 | Do | De | Ao | Ae | Bo | Be | Bo | De | Ao | Ae | Bo | Be | Bo | Ce | 3 |
| 18 | Ao | Ae | Bo | Be | Bo | Ce | Co | De | Ao | Ae | Bo | Be | Bo | Ce | 4 |
| 19 | Bo | Be | Bo | Ce | Co | De | Do | De | Ao | Ae | Bo | Be | Bo | Ce | 5 |
| 20 | Bo | Ce | Co | De | Do | De | Ao | De | Ao | Ae | Bo | Be | Bo | Ce | 1 |
| 21 | Co | De | Do | De | Ao | Ae | Bo | Ae | Bo | Be | Bo | Ce | Co | De | 1 |
| 22 | Do | De | Ao | Ae | Bo | Be | Bo | Ae | Bo | Be | Bo | Ce | Co | De | 2 |
| 23 | Ao | Ae | Bo | Be | Bo | Ce | Co | Ae | Bo | Be | Bo | Ce | Co | De | 3 |
| 24 | Bo | Be | Bo | Ce | Co | De | Do | Ae | Bo | Be | Bo | Ce | Co | De | 4 |
| 25 | Bo | Ce | Co | De | Do | De | Ao | Ae | Bo | Be | Bo | Ce | Co | De | 5 |

Figure 4A

|    | Q  | R  | S  | T  | U  | V  | W  | X  | Y  | Z  | AA | AB | AC | AD | AE | AF | AG | AH | AI | AJ |
|----|----|----|----|----|----|----|----|----|----|----|----|----|----|----|----|----|----|----|----|----|
|    |    |    |    |    |    |    |    |    |    |    |    |    |    |    |    |    |    |    |    | add frms |
| 1  | Co | De | Do | De | Ao | Ae | Bo | Be | Bo | Ce | Co | De | Do | De | Ao | Ae | Bo | Be | Bo | 0 |
| 2  | Do | De | Ao | Ae | Bo | Be | Bo | Ce | Co | De | Do | De | Ao | Ae | Bo | Be | Bo | Ce | Co | 4 |
| 3  | Ao | Ae | Bo | Be | Bo | Ce | Co | De | Do | De | Ao | Ae | Bo | Be | Bo | Ce | Co | De | Do | 3 |
| 4  | Bo | Be | Bo | Ce | Co | De | Do | De | Ao | Ae | Bo | Be | Bo | Ce | Co | De | Do | De | Ao | 2 |
| 5  | Bo | Ce | Co | De | Do | De | Ao | Ae | Bo | Be | Bo | Ce | Co | De | Do | De | Ao | Ae | Bo | 1 |
| 6  | Co | De | Do | De | Ao | Ae | Bo | Be | Bo | Ce | Co | De | Do | De | Ao | Ae | Bo | Be | Bo | 1 |
| 7  | Do | De | Ao | Ae | Bo | Be | Bo | Ce | Co | De | Do | De | Ao | Ae | Bo | Be | Bo | Ce | Co | 0 |
| 8  | Ao | Ae | Bo | Be | Bo | Ce | Co | De | Do | De | Ao | Ae | Bo | Be | Bo | Ce | Co | De | Do | 4 |
| 9  | Bo | Be | Bo | Ce | Co | De | Do | De | Ao | Ae | Bo | Be | Bo | Ce | Co | De | Do | De | Ao | 3 |
| 10 | Bo | Ce | Co | De | Do | De | Ao | Ae | Bo | Be | Bo | Ce | Co | De | Do | De | Ao | Ae | Bo | 2 |
| 11 | Co | De | Do | De | Ao | Ae | Bo | Be | Bo | Ce | Co | De | Do | De | Ao | Ae | Bo | Be | Bo | 2 |
| 12 | Do | De | Ao | Ae | Bo | Be | Bo | Ce | Co | De | Do | De | Ao | Ae | Bo | Be | Bo | Ce | Co | 1 |
| 13 | Ao | Ae | Bo | Be | Bo | Ce | Co | De | Do | De | Ao | Ae | Bo | Be | Bo | Ce | Co | De | Do | 0 |
| 14 | Bo | Be | Bo | Ce | Co | De | Do | De | Ao | Ae | Bo | Be | Bo | Ce | Co | De | Do | De | Ao | 4 |
| 15 | Bo | Ce | Co | De | Do | De | Ao | Ae | Bo | Be | Bo | Ce | Co | De | Do | De | Ao | Ae | Bo | 3 |
| 16 | Co | De | Do | De | Ao | Ae | Bo | Be | Bo | Ce | Co | De | Do | De | Ao | Ae | Bo | Be | Bo | 3 |
| 17 | Do | De | Ao | Ae | Bo | Be | Bo | Ce | Co | De | Do | De | Ao | Ae | Bo | Be | Bo | Ce | Co | 2 |
| 18 | Ao | Ae | Bo | Be | Bo | Ce | Co | De | Do | De | Ao | Ae | Bo | Be | Bo | Ce | Co | De | Do | 1 |
| 19 | Bo | Be | Bo | Ce | Co | De | Do | De | Ao | Ae | Bo | Be | Bo | Ce | Co | De | Do | De | Ao | 0 |
| 20 | Bo | Ce | Co | De | Do | De | Ao | Ae | Bo | Be | Bo | Ce | Co | De | Do | De | Ao | Ae | Bo | 4 |
| 21 | Co | De | Do | De | Ao | Ae | Bo | Be | Bo | Ce | Co | De | Do | De | Ao | Ae | Bo | Be | Bo | 4 |
| 22 | Do | De | Ao | Ae | Bo | Be | Bo | Ce | Co | De | Do | De | Ao | Ae | Bo | Be | Bo | Ce | Co | 3 |
| 23 | Ao | Ae | Bo | Be | Bo | Ce | Co | De | Do | De | Ao | Ae | Bo | Be | Bo | Ce | Co | De | Do | 2 |
| 24 | Bo | Be | Bo | Ce | Co | De | Do | De | Ao | Ae | Bo | Be | Bo | Ce | Co | De | Do | De | Ao | 1 |
| 25 | Bo | Ce | Co | De | Do | De | Ao | Ae | Bo | Be | Bo | Ce | Co | De | Do | De | Ao | Ae | Bo | 0 |

Figure 4B

MAINTAINING CONTINUOUS FILM MODE WITH BAD EDITS

TECHNICAL FIELD

The present invention relates to video signal processing, and more particularly to digital video compression involving editing video programs which have been spliced (patched) together from two (or more) film-mode video sequences.

BACKGROUND ART

A movie, or motion picture, is a sequence of individual, still pictures (images). A plurality of images (pictures) are presented, one after the other, each differing slightly from the one before, to create the perception of motion. In both film (celluloid) and video (electronic signals), individual images are often referred to as "frames". In the context of film, there are typically 24 frames per second (fps). In the context of video, there are typically 30 frames per second (fps). The sequence of video frames may be "progressive" or "interlaced".

A progressive sequence has a single field in each frame. An interlaced sequence comprises two fields per frame—an odd field ("o") and an even field ("e")—thus, there are 60 fields (or half-resolution images) per second. (The two fields of an interlaced scan are also sometimes referred to as "top" and "bottom".) In the main, hereinafter, interlaced video sequences are discussed.

It would be a relatively simple matter to convert a film to video, if the frame rates (24 fps and 30 fps, respectively) were the same. Every film frame (image) would generate one video frame, each having two interlaced fields. However, because the frame rates of film and video are not the same, a system was developed, called "3-2 Pulldown" (or "3:2 pulldown", or "telecine") to convert film to video.

The 3-2 pulldown process basically converts every four film frames ("A", "B", "C", "D") to five video frames ("1", "2", "3", "4", "5"), each video frame comprising two fields (odd/o, even/e). The resulting five video frames (ten video fields) are related to the original four film frames, as follows:

TABLE 1

| The 3:2 pull-down process | | |
| --- | --- | --- |
| 4 Film Frames | 10 Fields | 5 Video Frames |
| A | Ao | 1 |
|   | Ae |   |
| B | Bo | 2 |
|   | Be |   |
|   | Bo' | 3 |
| C | Ce |   |
|   | Co | 4 |
| D | De |   |
|   | Do | 5 |
|   | De' |   |

Two video fields (Ao, Ae) are created for the first film frame (A). Three video fields (Bo, Be, Bo') are created for the second film frame (B), the second odd field (Bo'—primed) being a copy of the first odd field (Bo—not primed). Two video fields (Ce, Co) are created for the third film frame (C). Three video fields (De, Do, De') are created for the fourth film frame (D). Thus, the sequence of fields is Ao, Ae, Bo, Be, Bo', Ce, Co, De, Do, De', where "o" is odd, and "e" is even. The primed fields (second Bo, second De) are inserted/repeat fields. Note that the fields (odd/o, even/e) always alternate, and that the A-frame is the only frame in the sequence where a film frame (A) is completely reproduced on one and only one complete video frame (1).

The 3-2 pulldown process originally started with three fields (3-2-3-2), but it was soon discovered that starting with two fields (as in the Table above) produced better results, but the name was never changed (e.g., to "2-3 pulldown"). Hence, the 3-2-3-2 field configuration is actually normally a 2-3-2-3 field configuration.

MPEG-2 and "Film Mode"

One of the best known and most widely used video compression standards for encoding moving picture images (video) and associated audio is the MPEG-2 standard, provided by the Moving Picture Experts Group (MPEG). The MPEG-2 standard allows for the encoding of video over a wide range of resolutions, including higher resolutions commonly known as HDTV (high definition TV).

Prior to bitstream coding, a good encoder will eliminate redundant frames/fields from a 30 fps video signal which encapsulates an inherently 24 fps source. The MPEG decoder or display device will then repeat the frames or fields to recreate or synthesize the 30 frame/sec display rate. MPEG-2 provides specific picture header variables called repeat_first_field and top_field_first which explicitly signals (designates) which frames or fields are to be repeated, and how many times.

The film-mode process, often referred to as "3:2 pull-down reversal" or "inverse telecine," automatically detects and eliminates any duplicate (repeated) fields. This method can yield up to 20 percent compression efficiency when compared to video-originated material, and is one of the most widely applied pre-processing techniques today. Detecting "bad edits" that may have been created during the post-production process reveals where the 3:2 sequence has been interrupted. This allows the pre-processing activity to drop out of film mode when necessary and re-enter it when a consistent 3:2 sequence is again detected.

If film material is edited after the 3:2 pull-down operation, a cut should only occur at the 5-frame boundaries in order to preserve film mode. If a cut does not occur at a 5-frame boundary, an encoder will drop out of film mode, and search for another film mode sequence. This search may take as much at 100 frames. During this time, the encoder will process the sequence in video mode, using more bandwidth or requiring more quantization than if the sequence was processed in film mode. If the encoder did not drop out of film mode immediately, there is danger that fields will be displayed out of temporal sequence.

Figure 1:
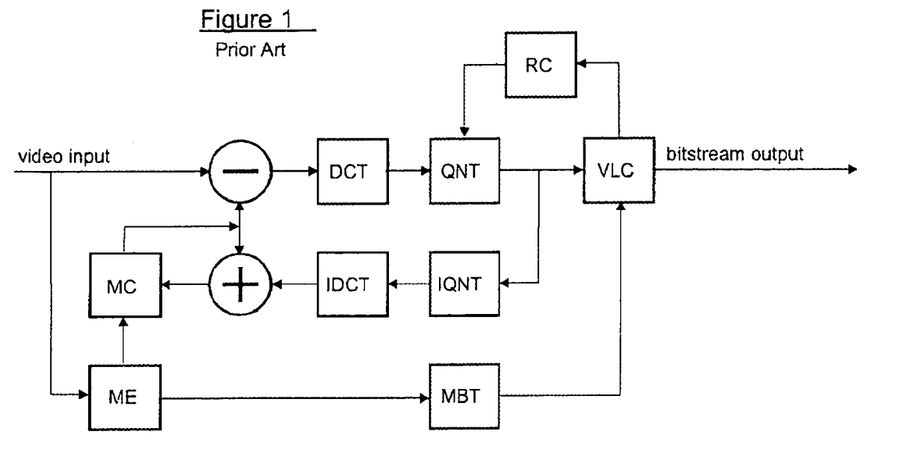
FIG. 1 is a block diagram of an MPEG-2 encoder, according to the prior art.

FIG. 1 is a functional block diagram of a typical MPEG-2 encoder of the prior art, the major functional blocks of which are: motion compensation (MC), motion estimation (ME), discrete cosine transform (DCT), inverse discrete cosine transform (IDCT), quantization (QNT), inverse quantization (IQNT), macroblock-type processing (MBT), rate control (RC), and variable-length coding (VLC), all connected as shown. The encoder receives a video input and outputs a bitstream. As is known, the encoder performs discrete cosine transformation and quantization on the video data, and compresses the data with variable-length coding.

U.S. Pat. No. 5,929,902

Figure 2:
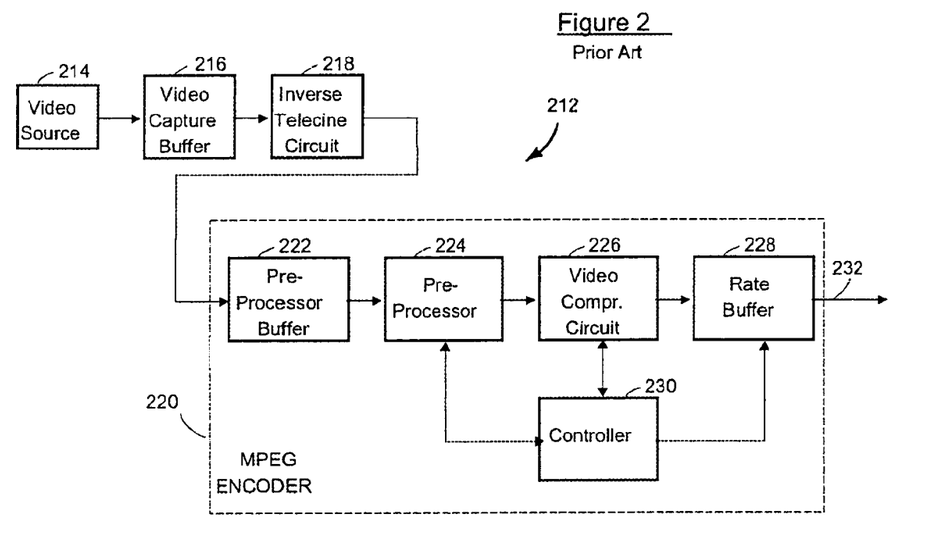
FIG. 2 is a block diagram of a video encoding system, according to the prior art.

U.S. Pat. No. 5,929,902 ("Kwok") discloses method and apparatus for inverse telecine processing by fitting 3:2 pull-down patterns. FIG. 2, corresponding to FIG. 1 therein, is a block diagram of an exemplary video encoding system of the prior art.

FIG. 2 shows an exemplary video encoding system 212 in which a sequence of frames are supplied from a video source 214. The video source 214 may be any digital video signal source such as a video camera or a telecine machine. The video encoding system 212 further includes a video capture buffer 216 for capturing the input video sequence and an inverse telecine circuit 218. The inverse telecine circuit 218 detects repeat fields in the input video sequence and causes these fields to be dropped so as not to waste valuable encoder resources on the compressing of repeat fields. The video encoding system 212 further includes an encoder 220 which may be an MPEG-1 or MPEG-2 compliant encoder. The encoder 220 includes a preprocessor buffer 222, a preprocessor 224, a video compression circuit 226, a rate buffer 228 and a controller 230.

The video compression circuit 226 receives a video signal from the preprocessor 224 in the form of a sequence of frames or fields and outputs a compressed digital video bit stream. The compressed digital video bit stream output by the video compression circuit 226 may comply with the syntax specified in video compression standards such as MPEG-1 or MPEG-2. Compression circuits which generate an MPEG-1 or MPEG-2 compliant bit stream are well known. The video bit stream generated by the video compression circuit 226 is stored in the rate buffer 228. The bit stream is then transmitted via a transmission channel 232 to one or more decoders which decode the received bit stream. Alternatively, the bit stream may be transmitted to an electronic or magnetic memory, a recordable optical disk or another suitable storage device.

The controller 230 controls the number of bits allocated by the video compression circuit 226 to the frames to be encoded. The controller 230 allocates bits to the frames to be encoded so as not to exceed the bandwidth in the channel 232 assigned to the encoding system 212 and so as to maintain certain limits on the occupancy of the rate buffer 228. This is turn prevents overflow and underflow conditions when the bit stream is received in a decoder buffer from the transmission channel 232 or from a storage device in which the bit stream has been previously stored.

The preprocessor 224 processes the video signal so that it may be compressed by the video compression circuit 226. For example, the preprocessor 224 may change the format of each frame including the number of horizontal or vertical pixels to meet parameters specified by the video compression circuit 216. In addition, the preprocessor 224 can detect scene changes or other changes which increase compression difficulty.

Using the techniques of the present invention, described hereinbelow, in a system such as described with respect to FIG. 2, the preprocessor 224 can detect interruptions to the 3:2 pulldown sequence which indicate bad edits and, via the controller 230, make corrections to the bad edits to preserve film mode.

GLOSSARY

Unless otherwise noted, or as may be evident from the context of their usage, any terms, abbreviations, acronyms or scientific symbols and notations used herein are to be given their ordinary meaning in the technical discipline to which the invention most nearly pertains. The following terms, abbreviations and acronyms may be used in the description contained herein:

3:2 Pulldown The technique used to convert 24 frames per second film to 30 frames per second video. A sequence of five video frames (1, 2, 3, 4, 5) is derived from 4 film frames (A, B, C, D) by alternatively recording two video fields (odd & even, alternatively F1 & F2, alternatively "o" and "e") from one film frame (A), then three video fields (one field is repeated) from the next film frame (B), then two video fields from the next film frame (C), then three video fields from the next film frame (D).

A-Frame Edit A video edit which starts on the first frame of the five video frame (4 film frame) sequence created when 24 frame film is transferred to 30 frame video (see 3:2 pulldown). The A-frame is the only frame in the sequence where a film frame is completely reproduced on one and only one complete video frame.

Field One half of a complete interlaced video picture (frame), containing all the odd ("o") or even ("e") scanning lines of the picture.

Frame One complete video image, containing two fields. There are 30 frames in one second of NTSC video Interlaced Video A process in which the picture (or a "field") is split into two fields by first sending all the odd numbered lines and then all the even numbered lines. A 30-frame interlaced system actually sends 60 separate images per second. This minimizes flicker in the transmitted image.

MPEG Moving (or Motion) Picture Experts Group. A working group of the ISO/IEC (International Organization for Standardization/International Engineering Consortium) in charge of the development of international standards for compression, decompression, processing, and coded representation of moving pictures, audio and their combination. The ISO has offices at 1 rue de Varembé, Case postale 56, CH-1211 Geneva 20, Switzerland. The IEC has offices at 549 West Randolph Street, Suite 600, Chicago, Ill. 60661-2208 USA.

NTSC National Television Systems Committee. The name of the television and video standard in use in the United States. NTSC uses a field rate of 60 fields per second. Two fields equals one complete frame.

Telecine A device that creates video from motion picture film.

SUMMARY OF THE INVENTION

When two video sequences, both of which are in a prescribed 3:2 pull-down sequence, are spliced (patched) together, the result may be a "bad edit". In a bad edit, the resulting spliced video sequence does not maintain the prescribed 3:2 pull-down sequence at the cut point. Bad film edits will cause an MPEG-2 encoder to drop out of film mode processing for up to 100 frames. This reduces the compression efficiency during this period.

According to the invention, when a bad edit is detected, frames are either deleted (dropped) or inserted (added) at the cut point to maintain the 3:2 pull-down sequence, thereby forcing continuous film mode. The "cost" is that up to 4 frames will be dropped, or up to 4 repeat frames will be inserted. The dropping/inserting of frames will cause a +/−2 frame jitter. (In cases where 5 frames could theoretically be deleted, it is preferred to implement an insert frame approach requiring fewer than five, typically zero, frames to be inserted.)

According to the invention, a method is provided for editing a spliced-together video comprising a cut-out sequence followed by a cut-in sequence, each of the cut-out and cut-in sequences being in 3:2 pull-down format, a cut point being defined at the end of the cut-out sequence which is the beginning of the cut-in sequence. The method comprises detecting a bad edit wherein the spliced-together video does not preserve the 3:2 pull-down format. The method further comprises either deleting a number of contiguous frames at the end of the cut-out sequence and/or a number of contiguous frames at the beginning of the cut-in sequence in order that the 3:2 pull-down sequence is preserved in the spliced-together video, or inserting a first number of frames at the end of the cut-out sequence and/or a second number of frames at the beginning of the cut-in sequence in order that the pull-down format is preserved in the spliced-together video.

According to a feature of the invention, when two or more frames are deleted or inserted, symmetry is preserved by deleting/inserting frames as equally as possible from/on both sides of the cut point.

A benefit of the invention is that an MPEG-2 encoder may use its own film detect sequence since the 3:2 pull-down sequence is always preserved.

BRIEF DESCRIPTION OF THE DRAWINGS

FIGS. 3A and 3B illustrate processing techniques for even field cuts in accordance with the principles of the invention.

FIGS. 4A and 4B illustrate processing techniques for odd field cuts in accordance with the principles of the invention.

DETAILED DESCRIPTION OF THE INVENTION

All input sequences referred to herein are assumed to be legal NTSC video, where each frame ("A", "B", "C", "D") has 2 fields ("o" and "e"), so it is illegal for the input to have 2 consecutive odd (o) fields or 2 consecutive even (e) fields—this would result in a synchronization loss and synchronization would have to be restored.

FIGS. (3A, 3B, 4A, 4B) do not show the repeat_first_field and top_field_first flags. These flags are tied to the letters (A,B,C,D), as follows. Referring to the following Table, each frame type (A-D) has a specific flag setting associate to it. For example when the Table shows a B frame (Bo, Be, Bo'), that frame will always have top_field_first set and repeat_first_field set.

TABLE 2

| | MPEG-2 flags | |
|---|---|---|
| Letter | top_field_first | repeat_first_field |
| A | 1 | 0 |
| B | 1 | 1 |
| C | 0 | 0 |
| D | 0 | 1 |

It should be noted that, in the Tables, the prime symbol (e.g., Bo', Do') is not used to indicate a repeat frame. Repeat frames will be evident from the context.

In the description of various embodiments of the invention that follows, the following general "rules" are applied:

Rule 1. All fields with the same letter (A-D) must come from the same original film frame. For example for a 'B' frame, fields Bo, Be, Bo' must originate from a single frame. This ensures that a sequence will not have a field out of temporal order. Each field in a sequence must have equal or later temporal reference. This rule also ensures the chrominance may be filtered in the vertical direction as a progressive frame, rather than 2 separate interlace fields. Chrominance is filtered in the vertical direction when converting from 4:2:2 format to 4:2:0 format for MPEG-2 Main Level/Main Profile (every other chrominance line is removed and the remaining lines are a filtered version of all the original chrominance lines).

Rule 2. When converting from a 2 field letter (A or C) to a 3 field letter (B or D), the repeat fields must contain the same video data.

Rule 3. A sequence must not have 2 same field types adjacent to each other. (must be odd, even, odd, eve, . . . ) (The field types must be alternating odd, even, odd, even, . . . )

Before proceeding with a description of embodiments of the invention, it should be understood that when splicing together film mode sequences observing the conventional pull-down sequence Ao, Ae, Bo, Be, Bo', Ce, Co, De, Do, De', and observing the odd-even-odd-even (alternating field parity) rule, for each of the 5 even film fields Ae, Be, Ce, De, De' which may be at the end of the cut-out sequence, there are 5 odd film fields Ao, Bo, Bo', Co, Do that can be at the beginning of the cut-in sequence. Hence, there are 25 possibilities of a sequence resulting from an edit, for each of an odd (o) cut and an even (e) cut. Most of these possibilities represent what is termed "bad edits".

Figure 3A:
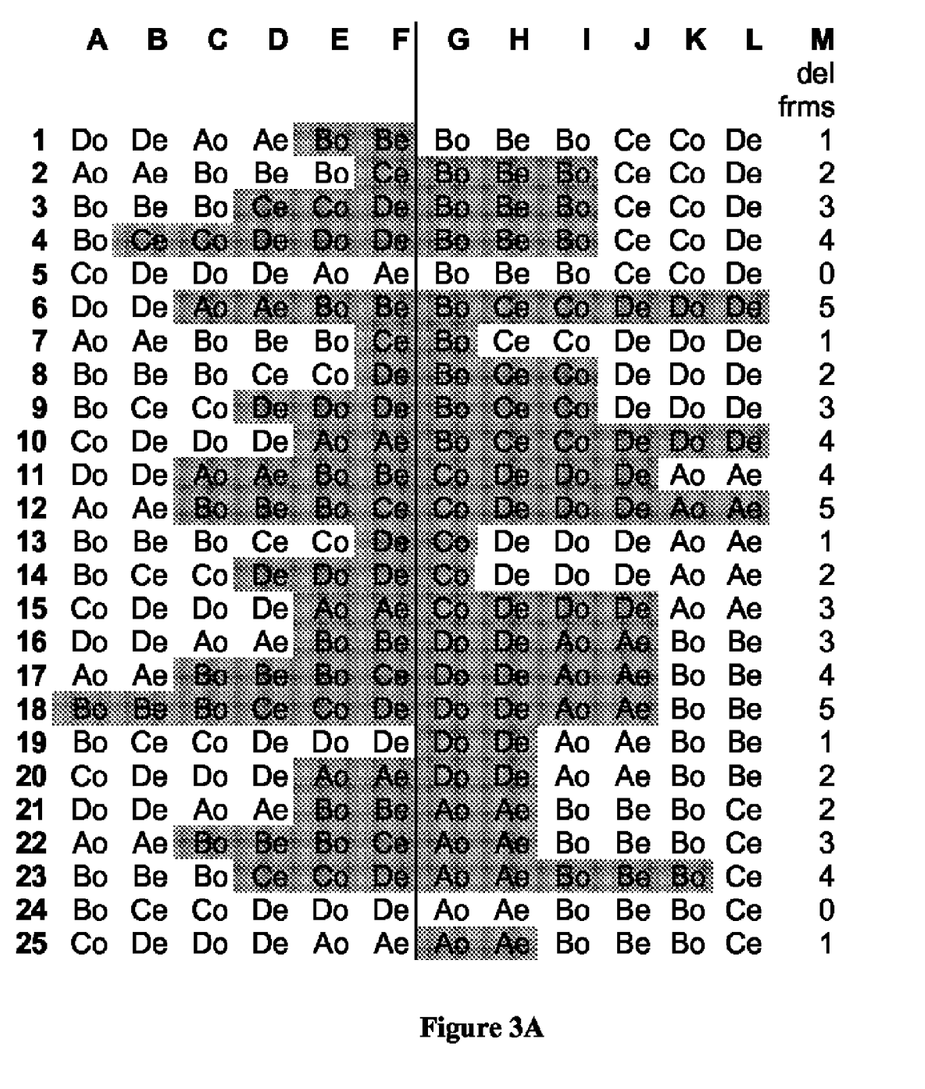

The present invention deletes or inserts frames to force continuous film mode. FIGS. 3A and 3B shows each bad edit and how fields are deleted (dropped) or inserted (added) to maintain the 3:2 pull-down sequence. The benefit of this approach is that there no disruption in film mode. The "cost" is up to 4 repeat frames will be inserted, or up to 5 frames will be dropped. The adding/dropping of frames will cause a +/−2 frame jitter.

FIG. 3A. Brute Force Film Processing with Even Field Cuts—Delete (Drop) Frames

FIG. 3A illustrates an embodiment of the invention for "brute-force" film processing with even field cuts, drop (delete) frames. Columns A-F illustrate the cut-out sequence. Columns G-L illustrate the cut-in sequence. The cut point is between columns F and G. Column M is a tally of how many frames are dropped (deleted) to preserve the 3:2 pull-down film mode sequence.

There are 5 possible even field (e) cut-out points (Ae, Be, Ce, De, De'), for each of which there are 5 possible odd field (o) cut-in points (Ao, Bo, Bo', Co, Do). The Table therefore has 25 rows, numbered 1-25, showing these 5×5=25 possibilities.

It can be observed, for example, in FIG. 3A, that there are 5 instances of the field Ae being the cut-out point, and these are shown in rows 5, 10, 15, 20, 25. There are 5 instances of field Be being the cut-out point, and these are shown in rows 1, 6, 11, 16, 21. There are 5 instances of field Ce being the cut-out point, and these are shown in rows 2, 7, 12, 17, 22. There are 5 instances of field De being the cut-out point, and these are shown in rows 3, 8, 13, 18, 23. There are 5 instances of field De (i.e., the repeat field De') being the cut-out point, and these are shown in rows 4, 9, 14, 19, 24.

In most instances, the resulting input video sequence shown in columns A-L is a "bad edit", meaning that the pattern of frames/fields departs (albeit, only at and around the cut point) from the pull-down sequence which needs to be detected (e.g., by an MPEG-2 encoder). The present invention corrects bad edits.

In row 1, for example, a bad edit is shown. The splice is "bad" because it does not follow the prescribed pull-down sequence. This can be detected by comparing the spliced sequence with a look-up Table (based on FIG. 3A). According to this embodiment of the invention, bad edits can be corrected, by deleting frames at and around the cut point. Generally, if more than one frame needs to be deleted, it is preferable to delete the same number of frames both before and after the cut point, preserving "symmetry".

In row 1, the frame B (fields Bo and Be, shaded, columns E, F) is deleted from the cut-out sequence (columns A-F) of the spliced video to preserve the pull down sequence (2-3-2-3) in the resulting output video. For row 1, the output will therefore be . . . Do, De, Ao, Ae, cut, Bo, Be, Bo, Ce, Co, De . . . . In row 1, 1 frame is deleted.

Here, for example, an alternative could have been to delete the B frame (Bo, Be, columns G,H) from the beginning of the cut-in sequence. However, that would result in the need to replace Bo (column I) with Bo (column E). Therefore, it is preferred, for the sake of simplicity, to delete the B frame from the end of the cut-out sequence to avoid the need to make a copy.

In row 2, the frame C (field Ce, shaded, column F) is deleted from the end of the cut-out sequence, and the frame B (fields Bo, Be, Bo, shaded, columns G-I) are deleted from the beginning of the cut-in sequence to preserve the pull down sequence in the resulting output video. For row 2, the output will be . . . Ae, Ao, Bo, Be, Bo, cut, Ce, Co, De . . . 2 frames are deleted.

In row 3, the frames C and D (fields Ce, Co, De, shaded, columns D-F) are deleted from the end of the cut-out sequence, and the frame B (fields Bo, Be, Bo, shaded, columns G-I) is deleted from the beginning of the cut-out sequence to preserve the pull down sequence in the resulting output video. For row 3, the output will be . . . Bo, Be, Bo, cut, Ce, Co, De . . . 3 frames are deleted.

In row 4, the frames C and D (fields Ce, Co, De, shaded, columns B-F) are deleted from the end of the cut-out sequence, and the frame B (fields Bo, Be, Bo, shaded, columns G-I) is deleted from the beginning of the cut-out sequence to preserve the pull down sequence in the resulting output video. For row 4, the output will be . . . Bo, Be, Bo, cut, Ce, Co, De . . . 4 frames are deleted.

It should be understood that deleted frames refers to the 3-2 pull down sequence (30 fps) as received by the brute force film processor—therefore 2 "fields" make up 1 "frame". 4 frames deleted=8 fields deleted.

Row 5 is not a bad edit. In row 5, the cut-out sequence ends with field Ae and the cut-in sequence begins with field Bo (i.e., not the repeat field Bo'), so no frames need to be deleted (or inserted, compare FIG. 3B). The output will be the same as the input, complying with the prescribed 3:2 pull-down sequence.

In row 6, the frames A and B (fields Ao, Ae, Bo, Be, shaded, columns C-F) are deleted from the end of the cut-out sequence, and the frames B, C and D (fields Bo, Ce, Co, De, Do, De, shaded, columns G-L) are deleted from the beginning of the cut-in sequence to preserve the pull down sequence in the resulting output video. For row 6, the output will be . . . fields Do and De from the cut-out sequence, cut, followed by subsequent (not shown) fields Ao, Ae, etc . . . from the cut-in sequence. 5 frames are deleted.

In the example of row 6 it can be seen that it is preferred to delete substantially the same number of fields from either side of the edit (cut) point—in this case 4 from the end of the cut-out sequence and 6 from the beginning of the cut-in sequence. Alternatively, the deletions could be less "balanced".

In row 7, the field Ce (column F, shaded) is deleted from the end of the cut-out sequence, and the field Bo (column G, shaded) is deleted from beginning of the cut-in sequence to preserve the pull down sequence in the resulting output video. For row 7, the output will be . . . Ae, Ao, Bo, Be, Bo, cut, Ce, Co, De, Do, De . . . . Overall, 2 fields (=1 frame) are deleted.

In row 8, the field De (column F, shaded) is deleted from the end of the cut-out sequence, and the fields Bo, Ce, Co (columns G-I, shaded) are deleted from the beginning of the cut-out sequence to preserve the pull down sequence in the resulting output video. For row 8, the output will be . . . Bo, Be, Bo, Ce, Co, cut, De, Do, De . . . . Overall, 2 frames (=4 fields) are deleted.

A viable alternative for the case of row 8 would be to delete fields Ce, Co, De, Bo (columns D,E,F,G). This would preserve the desire to delete substantially the same number of fields from either side of the edit (cut) point.

In row 9, the frame D (fields De, Do, De, shaded, columns D-F) is deleted from the end of the cut-out sequence, and the frames B and C (fields Bo, Ce, Co, shaded, columns G-I) are deleted from the beginning of the cut-out sequence to preserve the pull down sequence in the resulting output video. For row 9, the output will be . . . Bo, Ce, Co, cut, De, Do, De . . . 3 frames are deleted.

In row 10, the frame A (fields Ao, Ae, shaded, columns E-F) is deleted from the end of the cut-out sequence, and the frames B, C, and D (fields Bo, Ce, Co, De, Do, De, shaded, columns G-L) are deleted from the beginning of the cut-out sequence to preserve the pull down sequence in the resulting output video. For row 10, the output will be . . . fields Co, De, Do De from the cut-out sequence, cut, followed by subsequent (not shown) fields Ao, Ae, etc . . . from the cut-in sequence. 4 frames are deleted.

In row 11, the frames A and B (fields Ao, Ae, Bo, Be, shaded, columns C-F) are deleted from the end of the cut-out sequence, and the frames C and D (fields Co, De, Do, De, shaded, columns G-J) are deleted from the beginning of the cut-in sequence to preserve the pull down sequence in the resulting output video. For row 11, the output will b . . . fields Do and De from the cut-out sequence, cut, followed by subsequent (not shown) fields Ao, Ae, etc . . . from the cut-in sequence. 4 frames are deleted.

In row 12, the frames B and C (fields Bo, Be, Bo, Ce, shaded, columns C-F) are deleted from the end of the cut-out sequence, and the frames C, D and A (fields Co, De, Do, De, Ao, Ae, shaded, columns G-L) are deleted from the beginning of the cut-in sequence to preserve the pull down sequence in the resulting output video. For row 12, the output will be . . . fields Ao and Ae from the cut-out sequence, cut, followed by subsequent (not shown) fields Bo, Be, etc . . . from the cut-in sequence. 5 frames are deleted.

As discussed hereinbelow, it is preferred not to delete 5 frames, as shown in row 12 (as well as in row 18, below, as well as in rows 1, 19 and 25 of FIG. 4A, below), but rather to implement a solution which inserts zero frames. The cases of deleting 5 frames are included in the Tables, for completeness of description.

In row 13, the frame D (field De, shaded, column F) is deleted from the end of the cut-out sequence, and the frame C (field Co, shaded, column G) is deleted from the beginning of the cut-in sequence to preserve the pull down sequence in the resulting output video. For row 13, the output will be . . . fields Bo, Be, Bo, Ce, and Co from the cut-out sequence, cut, followed by subsequent fields Do, De, Do, Ao, Ae, etc . . . from the cut-in sequence. 1 frame is deleted.

In row 14, the frame D (fields De, Do, De, shaded, columns D,E,F) is deleted from the end of the cut-out sequence, and the frame C (field Co, shaded, column G) is deleted from the beginning of the cut-in sequence to preserve the pull down sequence in the resulting output video. For row 14, the output will be . . . fields Bo, Ce, Co, from the cut-out sequence, cut, followed by fields De, Do, De, Ao, Ae, etc . . . from the cut-in sequence. 2 frames are deleted.

In row 15, the frame A (fields Ao, Ae, shaded, columns E-F) are deleted from the end of the cut-out sequence, and the frames C and D (fields Co, De, Do, De, shaded, columns G-J) are deleted from the beginning of the cut-in sequence to preserve the pull down sequence in the resulting output video. For row 15, the output will be . . . fields Co, De, Do, De, from the cut-out sequence, cut, followed by fields Ao, Ae, etc . . . from the cut-in sequence. In row 15, 3 frames are deleted.

In row 16, the frame B (fields Bo, Be, shaded, columns E-F) are deleted from the end of the cut-out sequence, and the frames D and A (fields Do, De, Ao, Ae, shaded, columns G-J) are deleted from the beginning of the cut-in sequence to preserve the pull down sequence in the resulting output video. For row 16, the output will be . . . fields Do, De, Ao, Ae from the cut-out sequence, cut, followed by fields Bo, Be, etc . . . from the cut-in sequence. In row 16, 3 frames are deleted.

A suitable alternative for the case of row 16 would be to delete fields Ao, Ae, Bo, Be, cut, Do, De (columns C,D,E,F, G,H).

In row 17, the frames B and C (fields Bo, Be, Bo, Ce, shaded, columns C-F) are deleted from the end of the cut-out sequence, and the frames D and A (fields Do, De, Ao, Ae, shaded, columns G-J) are deleted from the beginning of the cut-in sequence to preserve the pull down sequence in the resulting output video. For row 17, the output will be . . . fields Ao, Ae from the cut-out sequence, cut, followed by fields Bo, Be, etc . . . from the cut-in sequence. In row 17, 4 frames are deleted.

In row 18, the frames B, C and D (fields Bo, Be, Bo, Ce, Co, De, shaded, columns A-F) are deleted from the end of the cut-out sequence, and the frames D and A (fields Do, De, Ao, Ae, shaded, columns G-J) are deleted from the beginning of the cut-in sequence to preserve the pull down sequence in the resulting output video. For row 18, the output will be . . . fields Ao, Ae from the (previous, not shown) cut-out sequence, cut, followed by fields Bo, Be, etc . . . from the cut-in sequence. In row 18, 5 frames are deleted.

In row 19, no frames or fields are deleted from the end of the cut-out sequence, and the frame D (fields Do, De, shaded, columns G-H) are deleted from the beginning of the cut-in sequence to preserve the pull down sequence in the resulting output video. For row 19, the output will be . . . fields Bo, Ce, Co, De, Do, De from the cut-out sequence, cut, followed by fields Ao, Ae, Bo, Be etc . . . from the cut-in sequence. In row 17, 1 frame is deleted.

In row 20, the frame A (fields Ao, Ae, shaded, columns E-F) are deleted from the end of the cut-out sequence, and the frame D (fields Do, De, shaded, columns G-H) are deleted from the beginning of the cut-in sequence to preserve the pull down sequence in the resulting output video. For row 20, the output will be . . . fields Co, De, Do, De from the cut-out sequence, cut, followed by fields Ao, Ae, Bo, Be, etc . . . from the cut-in sequence. In row 20, 2 frames are deleted.

In row 21, the frame B (fields Bo, Be, shaded, columns E-F) is deleted from the end of the cut-out sequence, and the frame A (fields Ao, Ae, shaded, columns G-H) are deleted from the beginning of the cut-in sequence to preserve the pull down sequence in the resulting output video. For row 21, the output will be . . . fields Do, De, Ao, Ae from the cut-out sequence, cut, followed by fields Bo, Be, Bo, Ce, etc . . . from the cut-in sequence. In row 21, 2 frames are deleted.

In row 22, the frames B and C (fields Bo, Be, Co, Ce, shaded, columns C-F) are deleted from the end of the cut-out sequence, and the frame A (fields Ao, Ae, shaded, columns G-H) are deleted from the beginning of the cut-in sequence to preserve the pull down sequence in the resulting output video. For row 22, the output will be . . . fields Ao, Ae from the cut-out sequence, cut, followed by fields Bo, Be, Bo, Ce, etc . . . from the cut-in sequence. In row 22, 3 frames are deleted.

In row 23, the frames C and D (fields Ce, Co, De, shaded, columns D-F) are deleted from the end of the cut-out sequence, and the frames A and B (fields Ao, Ae, Bo, Be, Bo, shaded, columns G-K) are deleted from the beginning of the cut-in sequence to preserve the pull down sequence in the resulting output video. For row 23, the output will be . . . fields Bo, Be, Bo from the cut-out sequence, cut, followed by fields Ce, etc . . . from the cut-in sequence. In row 23, 4 frames are deleted.

Row 24 is not a bad edit. In row 24, the cut-out sequence ends with the field De and the cut-in sequence begins with field Ao, so no frames need to be deleted (or inserted). The output will be the same as the input, complying with the pull-down sequence.

In row 25, the cut-out sequence ends with the field Ae, and the frame A (fields Ao, Ae, shaded, columns G-H) are deleted from the beginning of the cut-in sequence to preserve the pull down sequence in the resulting output video. For row 25, the output will be . . . fields Co, De, Do, De, Ao, Ae from the cut-out sequence, cut, followed by fields Bo, Be, Bo, Ce etc . . . from the cut-in sequence. In row 25, 1 frame is deleted.

In the examples set forth above, it can be seen that bad edits in a spliced-sequence can be detected and corrected using a brute force technique, by deleting (dropping) fields from the end of the cut-out sequence and/or fields from the beginning of the cut-in sequence, in order that the desired pull-down sequence is preserved. The fields/frames which are deleted are contiguous with one another (i.e., no "skipping over" fields permitted). For all possible bad edits, only from 1 to 5 frames (2, 4, 6, 8 or 10 fields) need to be deleted (dropped). (Note that there are preferred alternatives, discussed herein, to dropping 5 frames.)

In the case of only 1 frame needing to be dropped, this may be two contiguous fields (both having the same frame letter) from the end of the cut-out sequence (e.g., row 1), two contiguous fields (both having the same frame letter) from the beginning of the cut-in sequence (e.g., row 25), or the last field (half frame) of the cut-out sequence and the first field (half frame) of the cut-in sequence (e.g., row 7).

In the case of more than one (2-5) frame needing to be dropped, it is preferable to delete a similar number of frames from both sides of the cut point—for example (see, e.g., row 18), 3 frames from the end of the cut-out sequence and 2 frames from the beginning of the cut-in sequence.

The methodology implemented by the present invention, and illustrated by the embodiment described with respect to FIG. 3A, is as follows:

In all cases of deleting frames to preserve the pull down sequence, the deleted frames are at the end of the cut-out sequence and/or at the beginning of the cut-in sequence.

Sometimes, the frame at the end of the cut-out sequence or the frame at the beginning of a cut-in sequence is not complete. For example, in row 2, the C frame at the end of the cut-out sequence is missing the Co field. For example, in row 7, the B frame at the beginning of a cut-in sequence is missing the Be field. These "incomplete" frames must, in all cases, be deleted.

In the case of 1 deleted frame, there may be a choice of whether to delete the frame at the end of the cut-out sequence or the frame at the beginning of the cut-in sequence arises when the frame letter is the same (e.g., B). For example, in row 25, the A frame at the beginning of the cut-in sequence is deleted. Alternatively, the A frame at the end of the cut-out sequence could be deleted. There is no particular preference here—it is a matter of choice.

In the case of 2 deleted frames, there may also be a choice of whether to delete frames from the cut-out sequence or the cut-in sequence. For example, in row 2 after deleting the incomplete C frame at the end of the cut-out sequence (must be deleted), the complete B frame from the beginning of the cut-in sequence is deleted. Alternatively, the complete B frame from the cut-out sequence could have been deleted. In contrast thereto, in row 14, the choice was made to delete the D frame from the cut-in sequence rather than the D frame from the cut-out sequence. Generally, it is preferred to maintain some kind of symmetry when deleting 2 or more frames, rather than being "lopsided" (doing all the deleting on only one side of the cut point.)

The invention, as described hereinabove, involves the basic steps of:
1. Determine frame type (A-D, odd/even) at cut-in and cut-out.
2. Determine number of frames needed to delete to preserve the 3-2 sequence.
   a. When deleting a frame (A-D), all fields from each frame type must be deleted.
   b. Do not leave incomplete frames (A-D).
   c. Preserve symmetry by deleting as equally as possible from both sides of the cut.
3. A frame that straddles the cut point must have all fields in temporal order.
   a. If not, an entire 5-frame sequence that straddles the cut point must be deleted.

FIG. 3B. Brute-Force Film Processing with Even Field Cut, Add (Insert) Frames.

FIG. 3B illustrates brute-force film processing with even field cut, add frames. Rows 1-25 correspond to rows 1-25 of FIG. 3A.

Columns Q-AH in FIG. 3B illustrate how the film sequence can be preserved by inserting frames. Column AI shows the number of frames (if any) which are inserted (added).

Here, in FIG. 3B, the cut-out sequences extend from column Q through column V (corresponding to columns A-F of FIG. 3A). However, in FIG. 3B, the starting point of the cut-in sequences varies, depending upon how many frames (if any) are inserted. In each row, a dark vertical line indicates the cut point(s).

Generally, the inserted frames are between the 2 vertical lines in each row (except for rows 5, 6, 12, 18, 24 which do not have any inserted frames). Some fields are shown with bold characters. The shaded field's video content have been copied from the bold fields. The light shaded fields have been copied from the bold fields to their left and, if necessary, renamed. The dark shaded fields have been copied from the bold fields to their right and, if necessary, renamed.

In other words, there is normally (in most of the 25 cases, or rows of the Table) a cut-out sequence, followed by fields which are copied from the cut-out sequence and inserted, followed by fields which are copied from the cut-in sequence and inserted, followed by fields from the cut-in sequence. No fields are deleted in FIG. 3B.

In FIG. 3B, frames are inserted as follows:

| | |
|---|---|
| row 1 | the inserted frames are between columns W and AD, inclusive. |
| row 2 | the inserted frames are between columns W and AB inclusive. |
| row 3 | the inserted frames are between columns W and Z, inclusive. |

-continued

| | |
|---|---|
| row 4 | the inserted frames are between columns W and X, inclusive. |
| row 5 | there are NO inserted frames |
| row 6 | there are NO inserted frames. |
| row 7 | the inserted frames are between columns W and AD, inclusive. |
| row 8 | the inserted frames are between columns W and AB, inclusive. |
| row 9 | the inserted frames are between columns W and Z, inclusive. |
| row 10 | the inserted frames are between columns W and X, inclusive. |
| row 11 | the inserted frames are between columns W and X, inclusive. |
| row 12 | there are NO inserted frames. |
| row 13 | the inserted frames are between columns W and AD, inclusive. |
| row 14 | the inserted frames are between columns W and AB, inclusive. |
| row 15 | the inserted frames are between columns W and Z, inclusive. |
| row 16 | the inserted frames are between columns W and Z, inclusive. |
| row 17 | the inserted frames are between columns W and X, inclusive. |
| row 18 | there are NO inserted frames. |
| row 19 | the inserted frames are between columns W and AD, inclusive. |
| row 20 | the inserted frames are between columns W and AB, inclusive. |
| row 21 | the inserted frames are between columns W and AB, inclusive. |
| row 22 | the inserted frames are between columns W and Z, inclusive. |
| row 23 | the inserted frames are between columns W and X, inclusive. |
| row 24 | there are NO inserted frames. |
| row 25 | the inserted frames are between columns W and AD, inclusive |

Row 1, for example, represents a bad edit. In row 1, the cut-out sequence extends from columns Q-V (corresponding to columns A-F of FIG. 3A) and ends with fields Ae, Bo, Be, and the cut-in sequence extends from columns AE-AH (corresponding to columns G-J of FIG. 3A) and begins with fields Bo, Be Bo'. Columns W-AD represent inserted frames/fields.

In row 1, the three fields Bo', Ce, Co (columns W-Y, shaded) are copied from the last two fields Bo, Be (bold, columns U and V) of the cut-out sequence, as follows:

The field Bo' (column W, shaded) is copied from the field Bo (column U, bold).

The field Ce (column X, shaded) is copied/renamed from the field Be (column V, bold).

The field Co (column Y, shaded) is copied/renamed from the field Bo (column U, bold). These three fields Bo', Ce, Co (shaded, columns W-Y) are inserted at the end of the cut-out sequence.

In row 1, the five fields De, Do, De', Ao, Ae (columns Z-AD, shaded) are copied from the first two fields Bo, Be (columns AE and AF, bold) of the cut-in sequence, as follows.

The field De (column Z, shaded) is copied/renamed from the field Be (column AF, bold). The field Do (column AA, shaded) is copied/renamed from the field Bo (column AE, bold).

The field De' (column AB, shaded) is copied/renamed from the field Be (column AF, bold).

The field Ao (column AC, shaded) is copied/renamed from the field Bo (column AE, bold).

The field Ae (column AD, shaded) is copied/renamed from the field Be (column AF, bold).

These five fields De, Do, De', Ao, Ae (columns Z-AD, shaded) are inserted at the beginning of the cut-in sequence. The fields which are inserted (columns W-AD) between the cut-out sequence and the cut-in sequence preserve the pull down sequence in the resulting output video.

For row 1, the output will be as shown in row 1 columns Q-AH. In row 1, 4 frames are inserted (added).

Generally, the reason that some of the inserted fields are copied from the last contiguous fields before the cut and some of the inserted fields are copied from the first contiguous fields after the cut is preferred, to make the repeat (inserted) fields less noticeable. However, it is within the scope of the invention that one could copy only the last fields before the cut for all inserted frames; or one could copy only the first fields after the cut for all inserted frames. For example, in row 1, all of the inserted fields Bo, Ce, Co, De, Do, De', Ao, Ae could be copied only from fields Bo, Be (columns U and V) of the cut-out sequence. Or, they could be copied only from fields Bo, Be (columns AE, AF) of the cut-in sequence. However, as was the case with deleting frames (FIG. 3A), in the case of inserting frames (FIG. 3B), it is preferred to preserve symmetry about the cut point.

In row 2, the cut-out sequence extends from columns Q-V, the inserted fields extend from column W-AB, and the cut-in sequence extends from columns AC-AI. Here, 3 frames are inserted, as follows:

Fields Co, De, Do, De' (columns W-Z, shaded) are copied/renamed from fields Be, Bo (columns T and U, bold), and are inserted after the end of the cut-out sequence.

Fields Ao, Ae (columns AA and AB, shaded) are copied/renamed from fields Bo, Be (columns AC and AD, bold), and are inserted before the beginning of the cut-in sequence.

Row 2 illustrates a nuance of the invention. In some cases (e.g., rows 2, 3, 7, 8, 12, 13, 17, 18, 22, 23), some fields have been copied over, but are not inserted. These "copied-over" fields are indicated by shaded fields outside the 2 vertical lines in each row. This is done when a letter (frame) had it's fields cut, and rule #1 (all fields of a letter must come from the same original film frame) must be observed. For example, in row 2, the field Ce (column V) is shown as having been copied, but it is not an "inserted" field. It is the last field of the original cut-in sequence. It is copied/renamed from the Be field (column T).

In row 3, the cut-out sequence extends from columns Q-V, the inserted fields extend from column W-Z, and the cut-in sequence extends from columns AA-AI. Here, 2 frames are inserted, as follows:

Fields Do, De' (columns W and X, shaded) are copied/renamed from fields Ce, Co (columns T and U, bold), and are inserted after the end of the cut-out sequence.

Fields Ao, Ae (columns Y and Z, shaded) are copied/renamed from fields Bo, Be (columns AA and AB, bold), and are inserted before the beginning of the cut-in sequence.

In row 3, the field De (column V, shaded) is copied/renamed from the field Ce (column T). It is a "copied-over" field.

In row 4, the cut-out sequence extends from columns Q-V, the inserted fields extend from column W-X, and the cut-in sequence extends from columns Y-AI. Here, 1 frame is inserted, as follows:

Fields Ao, Ae (columns W and X, shaded) are copied/renamed from fields Bo, Be (columns Y and Z, bold), and are inserted between the end of the cut-out sequence and the beginning of the cut-in sequence.

Row 5 is not a bad edit. In row 5, the cut-out sequence extends from columns Q-V, and the cut-in sequence extends from columns W-AI. Here, no frames need to be copied, renamed or inserted. The "output" equals the "input".

In row 6, the cut-out sequence extends from columns Q-V, and the cut-in sequence extends from columns W-AI. Here, no frames are inserted. However, in the case illustrated by row 6, frame B straddles the cut point and all fields of a letter must come from the same original film frame. Therefore the field Bo at the beginning of the cut-in sequence (column W, shaded) must be replaced by (copied from) field Bo (column U, bold) from the last frame of the cut-out sequence.

In row 7, the cut-out sequence extends from columns Q-V, the inserted fields extend from column W-AD, and the cut-in sequence extends from columns AE-AI. Here, 4 frames are inserted, as follows:

Fields Co, De, Do, De' (columns W-Z, shaded) are copied/renamed from fields Be, Bo (columns T and U, bold), and are inserted after the end of the cut-out sequence.

Fields Ao, Ae, Bo, Be (columns AA-AD, shaded) are copied/renamed from fields Ce, Co (columns AF and AG, bold), and are inserted before the beginning of the cut-in sequence.

In row 7, the field Ce (column V, shaded) is copied/renamed from the field Be (column T). It is not an "inserted field". It is a "copied-over" field.

In row 7, the field Bo (column AE, shaded) is copied/renamed from the field Co (column AG). It is not an "inserted field". It is a "copied-over" field.

In row 8, the cut-out sequence extends from columns Q-V, the inserted fields extend from column W-AB, and the cut-in sequence extends from columns AC-AI. Here, 3 frames are inserted. In this row, frame D straddles the cut point and all fields of a letter must come from the same original film frame. Therefore De, Do, De must be replaced/renamed with Ce, Co, Ce respectively.

In row 9, the cut-out sequence extends from columns Q-V, the inserted fields extend from column W-Z, and the cut-in sequence extends from columns AA-AI. Here, 2 frames are inserted.

In row 9, frame B straddles the cut point and all fields of a letter must come from the same original film frame. Therefore the field Bo (column AA) must be replaced with Co (column AC).

In row 10, the cut-out sequence extends from columns Q-V, the inserted fields extend from column W-X, and the cut-in sequence extends from columns Y-AI. Here, 1 frame is inserted, as follows:

the fields Bo and Be (columns W and X, shaded) are copied/renamed from the fields Ao, Ae (columns U and V, bold), and are inserted between the end of the cut-out sequence and the beginning of the cut-in sequence.

In row 10, the frame B straddles the cut point and all fields of a letter must come from the same original film frame. Therefore the field Bo' (column Y) must be replaced with a copy of field Ao (column U, bold). This is not an "inserted field". It is a "copied-over" field.

In row 11, the cut-out sequence extends from columns Q-V, the inserted fields extend from column W-X, and the cut-in sequence extends from columns Y-AI. Here, no frames are inserted, but the frame C straddles the cut point and all fields of a letter must come from the same original film frame. Therefore:

the field Ce (column X, shaded) is are copied from the field Be (column V, bold), and the field Co (column Y, shaded) is copied from the field Bo (column W, bold).

In row 12, the cut-out sequence extends from columns Q-V, there are no inserted fields, and the cut-in sequence extends from columns W-AI.

In row 12, the frame C straddles the cut point and all fields of a letter must come from the same original film frame. Therefore the field Ce (column V) must be replaced/renamed with a copy of field Be (column T, bold), and the field Co (column W) must be replaced/renamed with a copy of field Bo (column U, bold). These are not "inserted fields".

In row 13, the cut-out sequence extends from columns Q-V, the inserted fields extend from column W-AD, and the cut-in sequence extends from columns AE-AI. Here, 4 frames are inserted, as follows:

Fields Do, De', Ao, Ae (columns W-Z, shaded) are copied/renamed from fields Ce, Co (columns T and U, bold), and are inserted after the end of the cut-out sequence.

Fields Bo, Be, Bo', Ce (columns AA-AD, shaded) are copied/renamed from fields De, Do (columns AF and AG, bold) and are inserted before the beginning of the cut-in sequence.

In row 13, the field Co (column AE, shaded) is copied/renamed from the field Do (column AG, bold). It is not an "inserted field".

In row 14, the cut-out sequence extends from columns Q-V, the inserted fields extend from column W-AB, and the cut-in sequence extends from columns AC-AI. Here, 3 frames are inserted, as follows:

Fields Ao, Ae, Bo, Be, Bo' (columns W-AA, shaded) are copied/renamed from fields Do, De' (columns U and V, bold), and are inserted after the end of the cut-out sequence.

Field Ce (columns AB, shaded) is copied/renamed from fields De (columns AD, bold) and is inserted before the beginning of the cut-in sequence.

In row 14, the field Co (column AC, shaded) is copied/renamed from the field Do (column AE, bold). It is not an "inserted field".

In row 15, the cut-out sequence extends from columns Q-V, the inserted fields extend from column W-Z, and the cut-in sequence extends from columns AA-AI. Here, 2 frames are inserted, as follows:

Fields Bo, Be, Bo' (columns W-Y, shaded) are copied/renamed from fields Ao, Ae (columns U and V, bold), and are inserted after the end of the cut-out sequence.

Field Ce (column Z, shaded) is copied/renamed from fields De (columns AB, bold) and is inserted before the beginning of the cut-in sequence.

In row 15, the frame C straddles the cut point and all fields of a letter must come from the same original film frame. Therefore the field Co' (column AA) must be replaced with a copy of field Do (column AC, bold). This is not an "inserted field". It is a "copied-over" field.

In row 16, the cut-out sequence extends from columns Q-V, the inserted fields extend from column W-Z, and the cut-in sequence extends from columns AA-AI. Here, 2 frames are inserted, as follows:

Fields Bo', Ce, Co (columns W-Y, shaded) are copied/renamed from fields Bo, Be (columns U and V, bold), and are inserted after the end of the cut-out sequence.

Field De (column Z, shaded) is copied/renamed from field De (columns AB, bold) and is inserted before the beginning of the cut-in sequence.

In row 17, the cut-out sequence extends from columns Q-V, the inserted fields extend from column W-X, and the cut-in sequence extends from columns Y-AI. Here, 1 frames is inserted, as follows:

Field Co (column W, shaded) is copied/renamed from field Bo (column U, bold), and is inserted after the end of the cut-out sequence.

Field De (column X, shaded) is copied/renamed from field De (column Z, bold) and is inserted before the beginning of the cut-in sequence.

In row 17, the frame C straddles the cut point and all fields of a letter must come from the same original film frame. Therefore the field Ce (column V) must be replaced with a copy of field Be (column T, bold). This is not an "inserted field". It is a "copied-over" field.

In row 18, the cut-out sequence extends from columns Q-V, there are no inserted fields, and the cut-in sequence extends from columns W-AI.

In row 18, the frame D straddles the cut point and all fields of a letter must come from the same original film frame. Therefore the fields De, Do, De (columns V-X) must be replaced with copies of fields Ce and Co (columns T, and U, bold). These are not "inserted fields". They are a "copied-over" fields. In this case, the field De was pieced together from the cut-out sequence and fields Do,De' from the cut-in sequence to produce the 3 fields for D.

In row 19, the cut-out sequence extends from columns Q-V, the inserted fields extend from column W-AD, and the cut-in sequence extends from columns AE-AI. Here, 4 frames are inserted, as follows:

Fields Ao, Ae, Bo, Be, Bo' (columns W-AA, shaded) are copied/renamed from fields Do, De' (columns U and V, bold), and are inserted after the end of the cut-out sequence.

Field Ce, Co, Ce (columns AB-AD, shaded) are copied/renamed from field Do, De (columns AE-AF, bold) and are inserted before the beginning of the cut-in sequence.

Row 19 illustrates an example of a frame (frame C, columns AB-AC) being repeated (frame D, columns AD-AF)

In row 20, the cut-out sequence extends from columns Q-V, the inserted fields extend from column W-AB, and the cut-in sequence extends from columns AC-AI. Here, 3 frames are inserted, as follows:

Fields Bo, Be, Bo' (columns W-Y shaded) are copied/renamed from fields Ao, Ae (columns U and V, bold), and are inserted after the end of the cut-out sequence.

Field Ce, Co, De (columns Z-AB, shaded) are copied/renamed from field Do, De (columns AC-AD, bold) and are inserted before the beginning of the cut-in sequence.

In row 21, the cut-out sequence extends from columns Q-V, the inserted fields extend from column W-AB, and the cut-in sequence extends from columns AC-AI. Here, 3 frames are inserted, as follows:

Fields Bo, Ce, Co (columns W-Y shaded) are copied/renamed from fields Bo, Be (columns U and V, bold), and are inserted after the end of the cut-out sequence.

Field De, Do, De (columns Z-AB, shaded) are copied/renamed from field Ao, Ae (columns AC-AD, bold) and are inserted before the beginning of the cut-in sequence.

In row 22, the cut-out sequence extends from columns Q-V, the inserted fields extend from column W-Z, and the cut-in sequence extends from columns AA-AI. Here, 2 frames are inserted, as follows:

Field Co (column W, shaded) is copied/renamed from field Bo (column U, bold), and is inserted after the end of the cut-out sequence.

Field De, Do, De (columns X-Z, shaded) are copied/renamed from field Ao, Ae (columns AA-AB, bold) and are inserted before the beginning of the cut-in sequence.

In row 22, the frame C straddles the cut point and all fields of a letter must come from the same original film frame. Therefore the field Ce (column V) must be replaced with a copy of field Be (column T, bold). This is not an "inserted field". It is a "copied-over" field.

In row 23, the cut-out sequence extends from columns Q-V, the inserted fields extend from column W-X, and the cut-in sequence extends from columns Y-AI. Here, 1 frame is inserted, as follows:

Fields Do and De (columns W-X, shaded) are copied/renamed from fields Ce, Co (columns T-U, bold), and are inserted after the end of the cut-out sequence.

No fields are copied from the cut-in sequence.

In row 23, the frame D straddles the cut point and all fields of a letter must come from the same original film frame. Therefore the field De (column V) must be replaced with a copy of field Ce (column T, bold). This is not an "inserted field". It is a "copied-over" field.

Row 24 is not a bad edit. In row 24, the cut-out sequence extends from columns Q-V, and the cut-in sequence extends from columns W-AI. Here, no frames need to be copied, renamed or inserted. The "output" equals the "input".

In row 25, the cut-out sequence extends from columns Q-V, the inserted fields extend from column W-AD, and the cut-in sequence extends from columns AE-AI. Here, 4 frames are inserted, as follows:

Fields Bo, Be, Bo', Ce, Co (columns W-AA, shaded) are copied/renamed from fields Ao, Ae (columns U-V, bold), and are inserted after the end of the cut-out sequence.

Field De, Do, De (columns AB-AD, shaded) are copied/renamed from field Ao, Ae (columns AE-AF, bold) and are inserted before the beginning of the cut-in sequence.

FIG. 3A showed 25 possibilities for deleting frames with even field cuts.

FIG. 3B showed 25 possibilities for inserting frames, with even field cuts.

For a given one of the 25 situations (rows 1-25), either frames may be deleted or frames may be added. For example, FIG. 3A, rows 12 and 18 show deleting 5 frames to preserve the pull-down sequence. However, rather than deleting 5 frames, it is preferable to add zero frames, using the techniques shown in rows 12 and 18 of FIG. 3B. (A similar situation exists with regard to rows 1, 19 and 25 of FIG. 4A, below.)

These are unique cases where the sequence at the edit (cut) point has the correct frame types, but those frames at the edit (cut) point are not from the same time. In the Tables, it is determined that fields are never copied in the brute force 'delete frame' method. The corresponding 'add frames' case for these cases show 0 frames are inserted by copying appropriate fields to force correct temporal order. Therefore in this case, the 5 frames would not be deleted, rather, the 'add frame' case would be implemented where fields are copied to preserve temporal order and to ensure that all fields of a letter come from the same original film frame. The delete case is included for completeness.

The reason that some of the inserted fields are copied from the last contiguous fields before the cut and some of the inserted fields are copied from the first contiguous fields after the cut is preferred, to make the repeat (inserted) fields less noticeable. However, it is within the scope of the invention that one could copy only the last fields before the cut for all inserted frames; or one could copy only the first fields after the cut for all inserted frames.

Figure 4A:
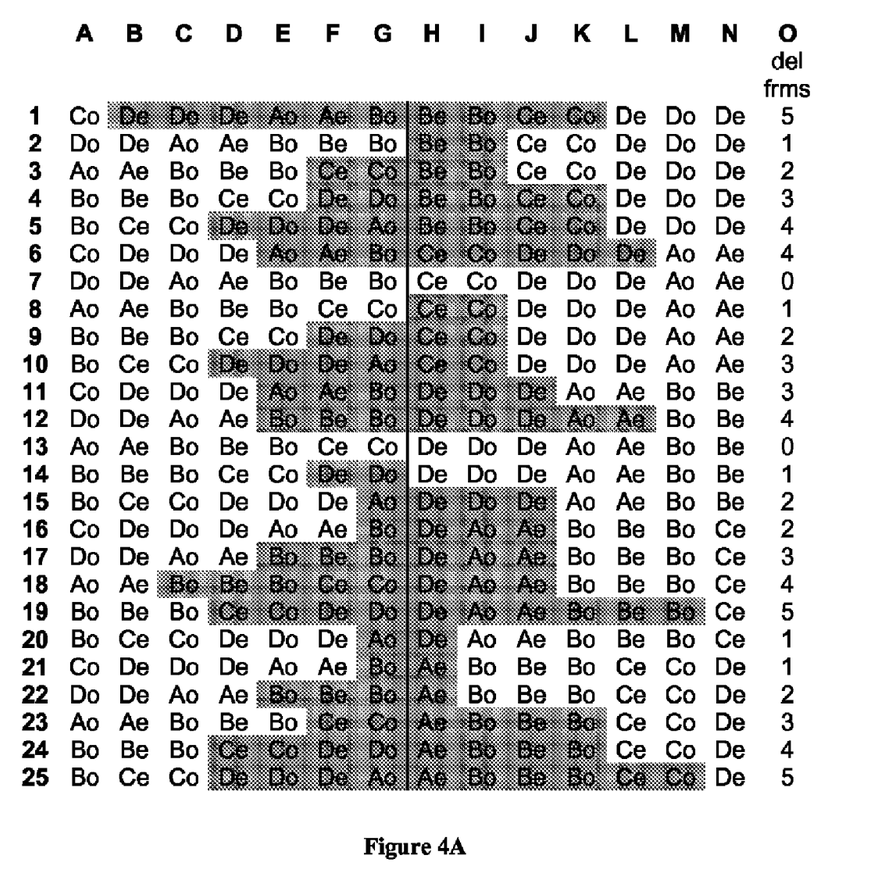

FIG. 4A. Brute Force Film Processing with Odd Field Cuts—Delete Frames.

FIGS. 3A and 3B, above, illustrated "brute force" film processing, either by deleting or inserting frames, respectively, when there are even field cuts.

FIGS. 4A and 4B, below, illustrate "brute force" film processing, either by deleting or inserting frames, respectively, when there are odd field cuts.

FIG. 4A illustrates brute force film processing with odd field cuts, delete frames. Columns A-G illustrate the cut-out sequence. Columns H-N illustrate the cut-in sequence. Column 0 is a tally of how many frames are dropped (deleted) to preserve the 3:2 pull-down film mode sequence. Again, there are 5 possible even (e) cut-out points (Ae, Be, Ce, De, De'), for each of which there are 5 possible odd (o) cut-in points (Ao, Bo, Bo', Co, Do). The Table in the figure has 25 rows, numbered 1-25, showing these 5×5=25 possibilities.

In row 1, for example, a bad edit is shown. The splice is "bad" because it does not follow the prescribed pull-down sequence. This can be detected by comparing the spliced sequence with a look-up Table. Bad edits can be corrected, as follows. Generally, if more than one frame needs to be deleted, it is preferable to delete the same number of fields both before and after the edit (cut) point.

In row 1, the frames D, A and B (fields De, Do, De', Ao, Ae, Bo, shaded, columns B-G) are deleted from the cut-out sequence, and fields Be, Bo, Ce, Co (columns H-K) are deleted from the beginning of the cut-in sequence of the spliced video to preserve the pull down sequence (2-3-2-3) in the resulting output video. For row 1, the output will therefore be . . . Co, cut, De, Do, De . . . Bo, Be, Bo, Ce, Co, De . . . . In row 1, 5 frames are deleted.

Again, as was the case with even field cuts (FIGS. 3A, 3B) some of these "delete frame" possibilities are preferably not implemented (namely, deleting 5 frames) in favor of preferably implementing a corresponding, less intrusive "add frame" solution (FIG. 4B). See also rows 19 and 25.

In row 2, no frames are deleted from the end of the cut-out sequence, and the frame B (fields Be, Bo, shaded, columns H-I) is deleted from the beginning of the cut-in sequence to preserve the pull down sequence in the resulting output video. For row 2, the output will be . . . Do, De, Ao, Ae, Bo, Be, Bo', cut, Ce, Co, De, Do, De' . . . . 1 frame is deleted.

In row 3, the frame C (fields Ce, Co, shaded, columns F-G) are deleted from the end of the cut-out sequence, and the frame B (fields Be, Bo, shaded, columns H-I) is deleted from the beginning of the cut-in sequence to preserve the pull down sequence in the resulting output video. For row 3, the output will be . . . Ao, Ae, Bo, Be, Bo', cut, Ce, Co, De, Do, De' . . . . 2 frames are deleted.

In row 4, the frame D (fields De, Do, shaded, columns F-G) are deleted from the end of the cut-out sequence, and the frames B and C (fields Be, Bo, Ce, Co, shaded, columns H-K) are deleted from the beginning of the cut-out sequence to preserve the pull down sequence in the resulting output video. For row 4, the output will be . . . Bo, Be, Bo', Ce, Co, cut, De, Do, De' . . . . 3 frames are deleted.

In row 5, the frames D and A (fields De, Do, De', Ao, shaded, columns D-G) are deleted from the end of the cut-out sequence, and the frames B and C (fields Be, Bo, Ce, Co, shaded, columns H-K) are deleted from the beginning of the cut-out sequence to preserve the pull down sequence in the resulting output video. For row 5, the output will be . . . Bo', Ce, Co, cut, De, Do, De' . . . . 4 frames are deleted.

In row 6, the frames A and B (fields Ao, Ae, Bo, shaded, columns E-G) are deleted from the end of the cut-out sequence, and the frames C and D (fields Ce, Co, De, Do, De', shaded, columns H-L) are deleted from the beginning of the cut-in sequence to preserve the pull down sequence in the resulting output video. For row 6, the output will be . . . Co, De, Do, De', cut, Ao, Ae . . . . 4 frames are deleted.

In the example of row 6 it can be seen that it is preferred to delete substantially the same number of fields from either side of the edit (cut) point—in this case 3 fields from the end of the cut-out sequence and 5 fields from the beginning of the cut-in sequence.

Row 7 is not a bad edit. The cut-out sequence ends with fields Bo, Be, Bo', and the cut in sequence begins with fields Co, Ce. No frames are deleted.

In row 8, the frame C (fields Ce, Co, shaded, columns H-I) are deleted from the beginning of the cut-out sequence to preserve the pull down sequence in the resulting output video. For row 8, the output will be . . . Ao, Ae, Bo, Be, Bo', Ce, Co, cut, De, Do, De, Ao, Ae . . . . 1 frame is deleted.

A viable alternative for the case of row 8 would be to delete fields frame C (fields Ce, Co, columns F,G) from the end of the cut-out sequence.

In row 9, the frame D (fields De, Do, shaded, columns F-G) is deleted from the end of the cut-out sequence, and the frame C (fields Ce, Co, shaded, columns H-I) is deleted from the beginning of the cut-out sequence to preserve the pull down sequence in the resulting output video. For row 9, the output will be . . . Bo, Ce, Co, cut, De, Do, De . . . . 2 frames are deleted.

In row 10, the frames D and A (fields De, Do, De', Ao, shaded, columns D-G) are deleted from the end of the cut-out sequence, and the frame C (fields Ce, Co, shaded, columns H-I) is deleted from the beginning of the cut-out sequence to preserve the pull down sequence in the resulting output video. For row 10, the output will be . . . fields Bo, Ce, Co from the cut-out sequence, cut, followed by subsequent fields De, Do, De', Ao, Ae, etc . . . from the cut-in sequence. 3 frames are deleted.

In row 11, the frames A and B (fields Ao, Ae, Bo, shaded, columns E-G) are deleted from the end of the cut-out sequence, and the frame D (fields De, Do, De', shaded, columns H-J) is deleted from the beginning of the cut-in sequence to preserve the pull down sequence in the resulting output video. For row 11, the output will be . . . fields Co, De, Do, De' from the cut-out sequence, cut, followed by subsequent fields Ao, Ae, Bo, Be, etc . . . from the cut-in sequence. 3 frames are deleted.

In row 12, the frame B (fields Bo, Be, Bo', shaded, columns E-G) is deleted from the end of the cut-out sequence, and the frames D and A (fields De, Do, De', Ao, Ae, shaded, columns H-L) are deleted from the beginning of the cut-in sequence to preserve the pull down sequence in the resulting output video. For row 12, the output will be . . . fields Do, De', Ao, Ae from the cut-out sequence, cut, followed by subsequent fields Bo, Be, etc . . . from the cut-in sequence. 4 frames are deleted.

Row 13 is not a bad edit. The cut-out sequence ends with fields Ce, Co, and the cut in sequence begins with fields De, Do, De'. No frames are deleted.

In row 14, the frame D (fields De, Do, shaded, columns F,G) is deleted from the end of the cut-out sequence to preserve the pull down sequence in the resulting output video. For row 14, the output will be . . . fields Bo, Be, Bo', Ce, Co, from the cut-out sequence, cut, followed by fields De, Do, De', Ao, Ae, etc . . . from the cut-in sequence. 1 frame is deleted.

In row 15, the frame A (field Ao, shaded, column G) is deleted from the end of the cut-out sequence, and the frame D (fields De, Do, De', shaded, columns H-J) are deleted from the beginning of the cut-in sequence to preserve the pull down sequence in the resulting output video. For row 15, the output will be . . . fields Bo, Ce, Co, De, Do, De', from the cut-out sequence, cut, followed by fields Ao, Ae, Bo, Be, etc . . . from the cut-in sequence. In row 15, 2 frames are deleted.

In row 16, the frame B (field Bo', shaded, column G) is deleted from the end of the cut-out sequence, and the frames D and A (fields De, Ao, Ae shaded, columns H-J) are deleted from the beginning of the cut-in sequence to preserve the pull down sequence in the resulting output video. For row 16, the output will be . . . fields Co, De,Do, De', Ao, Ae from the cut-out sequence, cut, followed by fields Bo, Be, Bo', Ce, etc . . . from the cut-in sequence. In row 16, 2 frames are deleted.

In row 17, the frame B (fields Bo, Be, Bo', shaded, columns E-G) is deleted from the end of the cut-out sequence, and the frames D and A (fields De, Ao, Ae shaded, columns H-J) are deleted from the beginning of the cut-in sequence to preserve the pull down sequence in the resulting output video. For row 17, the output will be . . . fields Do, De', Ao, Ae from the cut-out sequence, cut, followed by fields Bo, Be, Bo', Ce, etc . . . from the cut-in sequence. In row 17, 3 frames are deleted.

In row 18, the frames B and C (fields Bo, Be, Bo', Ce, Co, shaded, columns C-G) are deleted from the end of the cut-out sequence, and the frames D and A (fields De', Ao, Ae shaded, columns H-J) are deleted from the beginning of the cut-in sequence to preserve the pull down sequence in the resulting output video. For row 18, the output will be . . . fields Ao, Ae from the cut-out sequence, cut, followed by fields Bo, Be, Bo', Ce, etc . . . from the cut-in sequence. In row 18, 4 frames are deleted.

In row 19, the frames C and D (fields Ce, Co, De, Do, shaded, columns D-G) are deleted from the end of the cut-out sequence, and the frame D, A, and B (fields De', Ao, Ae, Bo, Be, Bo', shaded, columns H-M) are deleted from the beginning of the cut-in sequence to preserve the pull down sequence in the resulting output video. For row 19, the output will be . . . fields Bo, Be, Bo', from the cut-out sequence, cut, followed by fields Ce, etc . . . from the cut-in sequence. In row 19, 5 frames are shown as being deleted. Again, this is not the preferred solution for such a bad edit.

In row 20, one frame (two fields) are deleted, which are the field Ao from the end of the cut-out sequence, and the field De from the beginning of the cut-in sequence to preserve the pull down sequence in the resulting output video. For row 20, the output will be . . . fields Bo, Ce, Co, De, Do, De' from the cut-out sequence, cut, followed by fields Ao, Ae, Bo, Be, Bo', Ce etc . . . from the cut-in sequence. In row 20, 1 frame is deleted.

In row 21, one frame (two fields) are deleted, which are the field Bo from the end of the cut-out sequence, and the field Ae from the beginning of the cut-in sequence to preserve the pull down sequence in the resulting output video. For row 20, the output will be . . . fields Co, De, Do, De', Ao, Ae from the cut-out sequence, cut, followed by fields Bo, Be, Bo', Ce, Co, De, etc . . . from the cut-in sequence. In row 21, 1 frame is deleted.

In row 22, the frame B (fields Bo, Be, Bo', shaded, columns E-G) are deleted from the end of the cut-out sequence, and the frame A (field Ae, shaded, column H) is deleted from the beginning of the cut-in sequence to preserve the pull down sequence in the resulting output video. For row 22, the output will be . . . fields Do, De', Ao, Ae from the cut-out sequence, cut, followed by fields Bo, Be, Bo', Ce, Co, De, etc . . . from the cut-in sequence. In row 22, 2 frames are deleted.

In row 23, the frame C (fields Ce, Co, shaded, columns F-G) are deleted from the end of the cut-out sequence, and the frames A and B (fields Ae, Bo, Be, Bo', shaded, columns H-K) are deleted from the beginning of the cut-in sequence to preserve the pull down sequence in the resulting output video. For row 23, the output will be . . . fields Ao, Ae, Bo, Be, Bo' from the cut-out sequence, cut, followed by fields Ce, Co, De, etc . . . from the cut-in sequence. In row 23, 3 frames are deleted.

In row 24, the frames C and D (fields Ce, Co, De, Do, shaded, columns D-G) are deleted from the end of the cut-out sequence, and the frames A and B (fields Ae, Bo, Be, Bo', shaded, columns H-K) are deleted from the beginning of the cut-in sequence to preserve the pull down sequence in the resulting output video. For row 24, the output will be . . . fields Bo, Be, Bo' from the cut-out sequence, cut, followed by fields Ce, Co, De, etc . . . from the cut-in sequence. In row 23, 4 frames are deleted.

In row 25, the frames D and A (fields De, Do, De', Ao, shaded, columns D-G) are deleted from the end of the cut-out sequence, and the frames A, B and C (fields Ae, Bo, Be, Bo', Ce, Co, shaded, columns H-M) are deleted from the beginning of the cut-in sequence to preserve the pull down sequence in the resulting output video. For row 25, the output will be . . . fields Bo', Ce, Co from the cut-out sequence, cut, followed by fields De, etc . . . from the cut-in sequence. In row 23, 5 frames are shown as being deleted. Again, this is not the preferred solution for such a bad edit.

FIG. 4B illustrates brute-force film processing with odd field cut, insert frames.

Rows 1-25 correspond to rows 1-25 of FIG. 4A.

Columns Q-AI in FIG. 4B illustrate how the film sequence can be preserved by inserting frames. Column AJ shows the number of frames (if any) which are inserted.

In FIG. 4B, the cut-out sequence is shown extending between columns Q-W corresponding to columns A-G of FIG. 4A. However, the starting point of the cut-in sequences varies, depending upon how many frames (if any) are inserted (added). In each row, a dark vertical line indicates the cut point(s).

Generally, the inserted frames are between the 2 vertical lines in each row (except for rows 5, 6, 12, 18, 24 which do not have any inserted frames). Some fields are shown with bold characters. The shaded field's video content have been copied from the bold fields. The light shaded fields have been copied from the bold fields to their left and, if necessary, renamed. The dark shaded fields have been copied from the bold fields to their right and, if necessary, renamed.

In other words, there is normally (in most of the 25 cases, or rows of the Table) a cut-out sequence, followed by fields which are copied from the cut-out sequence and inserted, followed by fields which are copied from the cut-in sequence and inserted, followed by fields from the cut-in sequence. No fields are deleted in FIG. 4B.

In FIG. 4B, frames are inserted as follows:

| | |
|---|---|
| row 1 | there are NO inserted frames |
| row 2 | the inserted frames are between columns X and AE inclusive. |
| row 3 | the inserted frames are between columns X and AC inclusive. |
| row 4 | the inserted frames are between columns X and AA inclusive. |
| row 5 | the inserted frames are between columns X and Y inclusive. |
| row 6 | the inserted frames are between columns X and Y inclusive. |
| row 7 | there are NO inserted frames |
| row 8 | the inserted frames are between columns X and AE inclusive. |
| row 9 | the inserted frames are between columns X and AC inclusive. |
| row 10 | the inserted frames are between columns X and AA inclusive. |
| row 11 | the inserted frames are between columns X and AA inclusive. |
| row 12 | the inserted frames are between columns X and Y inclusive. |
| row 13 | there are NO inserted frames. |
| row 14 | the inserted frames are between columns X and AE inclusive. |
| row 15 | the inserted frames are between columns X and AC inclusive. |
| row 16 | the inserted frames are between columns X and AC inclusive. |
| row 17 | the inserted frames are between columns X and AA inclusive. |
| row 18 | the inserted frames are between columns X and Y inclusive. |
| row 19 | there are NO inserted frames. |
| row 20 | the inserted frames are between columns X and AE inclusive. |
| row 21 | the inserted frames are between columns X and AE inclusive. |
| row 22 | the inserted frames are between columns X and AC inclusive. |
| row 23 | the inserted frames are between columns X and AA inclusive. |
| row 24 | the inserted frames are between columns X and Y inclusive. |
| row 25 | there are NO inserted frames. |

Row 1 represents a bad edit. In row 1, the cut-out sequence extends from columns Q-W and ends with fields Ao, Be, Bo, and the cut-in sequence extends from columns X-AI and begins with fields Bo, Be Bo'. There are no inserted frames/fields.

In row 1, the frame B (column W) at the end of the cut-out sequence is incomplete. And the frame B straddles the cut point. Therefore, the field Bo (column W, shaded) is copied from the field Bo (column Y, bold) of the first frame of the cut-in sequence. This is not an inserted field. This ensures all fields of a letter come from the same original film frame.

In row 2, the cut-out sequence extends from columns Q-W, the inserted fields extend from column X-AE, and the cut-in sequence extends from columns AF-AI. Here, 4 frames are inserted, as follows:

Fields Ce, Co, De, Do, De' (columns X-AB, shaded) are copied/renamed from fields Bo, Be (columns U and V, bold), and are inserted after the end of the cut-out sequence.

Fields Ao, Ae,Bo (columns AC-AE, shaded) are copied/renamed from fields Be, Bo (columns AF-AG, bold), and are inserted before the beginning of the cut-in sequence.

In row 3, the cut-out sequence extends from columns Q-W, the inserted fields extend from column X-AC, and the cut-in sequence extends from columns AD-AI. Here, 3 frames are inserted, as follows:

Fields De, Do, De' (columns X-Z, shaded) are copied/renamed from fields Ce, Co (columns V and W, bold), and are inserted after the end of the cut-out sequence.

Fields Ao, Ae, Bo (columns AA-AC, shaded) are copied/renamed from fields Be, Bo (columns AD and AE, bold), and are inserted before the beginning of the cut-in sequence.

In row 4, the cut-out sequence extends from columns Q-W, the inserted fields extend from column X-AA, and the cut-in sequence extends from columns AB-AI. Here, 2 frames are inserted, as follows:

Field De' (column X, shaded) is copied/renamed from field De, (column V, bold), and is inserted after the end of the cut-out sequence.

Fields Ao, Ae, Bo (columns Y-AA, shaded) are copied/renamed from fields Be, Bo (columns AB and AC, bold), and are inserted before the beginning of the cut-in sequence.

In row 5, the cut-out sequence extends from columns Q-W, the inserted fields extend from column X-Y, and the cut-in sequence extends from columns Z-AI. Here, 1 frame is inserted, as follows:

Fields Ae and Bo (columns X-Y, shaded) are copied/renamed from fields Be, Bo (columns Z and AA, bold), and are inserted before the beginning of the cut-in sequence.

In row 5, the frame Ao (column W) at the end of the cut-out sequence is copied/renamed from the field Bo (column AA, bold) of the cut-in sequence. This is not an inserted field. It is a "copied-over" field.

In row 6, the cut-out sequence extends from columns Q-W, the inserted fields extend from column X-Y, and the cut-in sequence extends from columns Z-AI. Here, 1 frame is inserted, as follows:

Fields Be, Bo (columns X-Y, shaded) are copied/renamed from fields Ao, Ae (columns U and V, bold), and are inserted after the end of the cut-out sequence.

No fields are copied from the cut-in sequence.

In row 6, the frame Bo (column W) at the end of the cut-out sequence is copied/renamed from the field Ao (column U, bold) of the cut-out sequence. This is not an inserted field. It is a "copied-over" field.

Row 7 is not a bad edit. In row 7, the cut-out sequence extends from columns Q-W, and the cut-in sequence extends from columns X-AI. Here, no frames need to be copied, renamed or inserted. The "output" equals the "input".

In row 8, the cut-out sequence extends from columns Q-W, the inserted fields extend from column X-AE, and the cut-in sequence extends from columns AF-AI. Here, 4 frames are inserted, as follows:

Fields D, Do, De', Ao, Ae (columns X-AB, shaded) are copied/renamed from fields Ce, Co (columns V-W, bold), and are inserted after the end of the cut-out sequence.

Fields Bo, Be, Bo' (columns AC-AE, shaded) are copied/renamed from fields Ce, Co (columns AF-AG, bold), and are inserted before the beginning of the cut-in sequence.

In row 9, the cut-out sequence extends from columns Q-W, the inserted fields extend from column X-AC, and the cut-in sequence extends from columns AD-AI. Here, 3 frames are inserted, as follows:

Fields De', Ao, Ae (columns X-Z, shaded) are copied/renamed from fields De, Do (columns V-W, bold), and are inserted after the end of the cut-out sequence.

Fields Bo, Be, Bo' (columns AA-AC, shaded) are copied/renamed from fields Ce, Co (columns AD-AE, bold), and are inserted before the beginning of the cut-in sequence.

In row 10, the cut-out sequence extends from columns Q-W, the inserted fields extend from column X-AA, and the cut-in sequence extends from columns AB-AI. Here, 2 frames are inserted, as follows:

Field Ae (column X, shaded) is copied/renamed from field De (column V, bold), and is inserted after the end of the cut-out sequence.

Fields Bo, Be, Bo' (columns Y-AA, shaded) are copied/renamed from fields Ce, Co (columns AB-AC, bold), and are inserted before the beginning of the cut-in sequence.

In row 10, the frame Ao (column W) at the end of the cut-out sequence is copied/renamed from the field Do (column U, bold) of the cut-out sequence. This is not an inserted field. It is a "copied-over" field.

In row 11, the cut-out sequence extends from columns Q-W, the inserted fields extend from column X-AA, and the cut-in sequence extends from columns AB-AI. Here, 2 frames are inserted, as follows: Field Be, Bo (columns X-Y, shaded) is copied/renamed from field Ao,Ae, (columns U-V, bold), and is inserted after the end of the cut-out sequence.

Fields Ce, Co, (columns Z-AA, shaded) are copied/renamed from fields De, Do (columns AB-AC, bold), and are inserted before the beginning of the cut-in sequence.

In row 11, the frame Bo (column W) at the end of the cut-out sequence is copied/renamed from the field Bo (column Y, bold) of the cut-in sequence. This is not an inserted field. It is a "copied-over" field.

In row 12, the cut-out sequence extends from columns Q-W, the inserted fields extend from column X-Y, and the cut-in sequence extends from columns Z-AI. Here, 1 frame is inserted, as follows:

Fields Ce, Co (columns X-Y, shaded) are copied/renamed from fields Be, Bo (columns V-W, bold), and are inserted after the end of the cut-out sequence.

No fields are copied from the cut-in sequence.

Row 13 is not a bad edit. In row 13, the cut-out sequence extends from columns Q-W, and the cut-in sequence extends from columns X-AI. Here, no frames need to be copied, renamed or inserted. The "output" equals the "input".

In row 14, the cut-out sequence extends from columns Q-W, the inserted fields extend from column X-AE, and the cut-in sequence extends from columns AF-AI. Here, 4 frames are inserted, as follows:

Field De, Ao, Ae (columns X-Z, shaded) are copied/renamed from fields De, Do (columns V-W, bold), and are inserted after the end of the cut-out sequence.

Fields Bo, Be, Bo', Ce, Co (columns AA-AE, shaded) are copied/renamed from fields De, Do (columns AF-AG, bold), and are inserted before the beginning of the cut-in sequence.

In row 15, the cut-out sequence extends from columns Q-W, the inserted fields extend from column X-AC, and the cut-in sequence extends from columns AD-AI. Here, 3 frames are inserted, as follows:

Fields Ae, Bo, Be, Bo (columns X-AA, shaded) are copied/renamed from fields Do, De (columns U-V, bold), and are inserted after the end of the cut-out sequence.

Fields Ce, Co (columns AB-AC, shaded) are copied/renamed from fields De, Do (columns AD-AE, bold), and are inserted before the beginning of the cut-in sequence.

In row 15, the frame Ao (column W) at the end of the cut-out sequence is copied/renamed from the field Do (column U, bold) of the cut-out sequence. This is not an inserted field. It is a "copied-over" field.

In row 16, the cut-out sequence extends from columns Q-W, the inserted fields extend from column X-AC, and the cut-in sequence extends from columns AD-AI. Here, 3 frames are inserted, as follows:

Fields Be, Bo, Ce, Co (columns X-AA, shaded) are copied/renamed from fields Ao, Ae, (columns U-V, bold), and are inserted after the end of the cut-out sequence.

Fields De, Do (columns AB-AC, shaded) are copied/renamed from fields Ao, Ae (columns AE-AF, bold), and are inserted before the beginning of the cut-in sequence.

In row 16, the frame De (column AD) at the beginning of the cut-in sequence is copied/renamed from the field Ae (column AF, bold) of the cut-out sequence. This is not an inserted field. It is a "copied-over" field.

In row 17, the cut-out sequence extends from columns Q-W, the inserted fields extend from column X-AA, and the cut-in sequence extends from columns AB-AI. Here, 2 frames are inserted, as follows:

Fields Ce, Co (columns X-Y, shaded) are copied/renamed from fields Be, Bo (columns V-W, bold), and are inserted after the end of the cut-out sequence.

Fields De, Do (columns Z-AA, shaded) are copied/renamed from fields Ao, Ae (columns AC-AD, bold), and are inserted before the beginning of the cut-in sequence.

In row 17, the frame De (column AB) at the beginning of the cut-in sequence is copied/renamed from the field Ae (column AD, bold) of the cut-out sequence. This is not an inserted field. It is a "copied-over" field.

In row 18, the cut-out sequence extends from columns Q-W, the inserted fields extend from column X-Y, and the cut-in sequence extends from columns Z-AI. Here, 1 frame is inserted, as follows:

Fields De, Do (columns X-Y, shaded) are copied/renamed from fields Ce, Co (columns V-W, bold), and are inserted after the end of the cut-out sequence.

No fields are copied/renamed/inserted from the cut-in sequence.

In row 18, the frame De (column Z) at the beginning of the cut-in sequence is copied/renamed from the field Ce (column V, bold) of the cut-in sequence. This is not an inserted field. It is a "copied-over" field.

In row 19, the cut-out sequence extends from columns Q-W, there are no inserted fields, and the cut-in sequence extends from columns X-AI.

In row 19, the frame De (column X) at the beginning of the cut-in sequence is copied/renamed from the field De (column V, bold) of the cut-out sequence. This is not an inserted field. It is a "copied-over" field.

In row 20, the cut-out sequence extends from columns Q-W, the inserted fields extend from column X-AE, and the cut-in sequence extends from columns AF-AI. Here, 4 frames are inserted, as follows:

Fields Ae, Bo, Be, Bo' (columns X-AA, shaded) are copied/renamed from fields Do, De (columns U-V, bold), and are inserted after the end of the cut-out sequence.

Fields Ce, Co, De, Do (columns AB-AE, shaded) are copied/renamed from fields Ao, Ae (columns AG-AH, bold), and are inserted before the beginning of the cut-in sequence.

In row 20, the frame Ao (column W) at the end of the cut-out sequence is copied/renamed from the field Do (column U, bold) of the cut-out sequence. This is not an inserted field. It is a "copied-over" field.

In row 20, the frame De (column AF) at the beginning of the cut-in sequence is copied/renamed from the field Ae (column AH, bold) of the cut-in sequence. This is not an inserted field. It is a "copied-over" field.

In row 21, the cut-out sequence extends from columns Q-W, the inserted fields extend from column X-AE, and the cut-in sequence extends from columns AF-AI. Here, 4 frames are inserted, as follows:

Fields Be, Bo, Ce, Co (columns X-AA, shaded) are copied/renamed from fields Ao, Ae (columns U-V, bold), and are inserted after the end of the cut-out sequence.

Fields De, Do,De', Ao (columns AB-AE, shaded) are copied/renamed from fields Bo, Be (columns AG-AH, bold), and are inserted before the beginning of the cut-in sequence.

In row 21, the frame Bo (column W) at the end of the cut-out sequence is copied/renamed from the field Ao (column U, bold) of the cut-out sequence. This is not an inserted field. It is a "copied-over" field.

In row 21, the frame Ae (column AF) at the beginning of the cut-in sequence is copied/renamed from the field Be (column AH, bold) of the cut-in sequence. This is not an inserted field. It is a "copied-over" field.

In row 22, the cut-out sequence extends from columns Q-W, the inserted fields extend from column X-AC, and the cut-in sequence extends from columns AD-AI. Here, 3 frames are inserted, as follows:

Fields Ce, Co (columns X-Y, shaded) are copied/renamed from fields Be, Bo (columns V-W, bold), and are inserted after the end of the cut-out sequence.

Fields De, Do, De, Ao (columns Z-AC, shaded) are copied/renamed from fields Bo, Be (columns AE-AF, bold), and are inserted before the beginning of the cut-in sequence.

In row 22, the frame Ae (column AD) at the beginning of the cut-in sequence is copied/renamed from the field Be (column AF, bold) of the cut-in sequence. This is not an inserted field. It is a "copied-over" field.

In row 23, the cut-out sequence extends from columns Q-W, the inserted fields extend from column X-AA, and the cut-in sequence extends from columns AB-AI. Here, 2 frames are inserted, as follows:

Fields De, Do, De (columns X-Z, shaded) are copied/renamed from fields Ce, Co (columns V-W, bold), and are inserted after the end of the cut-out sequence.

Field Ao (column AA, shaded) is copied/renamed from field Bo (columns AC, bold), and is inserted before the beginning of the cut-in sequence.

In row 23, the frame Ae (column AB) at the beginning of the cut-in sequence is copied/renamed from the field Be (column AD, bold) of the cut-in sequence. This is not an inserted field. It is a "copied-over" field.

In row 24, the cut-out sequence extends from columns Q-W, the inserted fields extend from column X-Y, and the cut-in sequence extends from columns Z-AI. Here, 1 frame is inserted, as follows:

Field De (column X, shaded) is copied/renamed from field Ce (column V, bold), and is inserted after the end of the cut-out sequence.

Field Ao (column Y, shaded) is copied/renamed from field Bo (column AA, bold), and is inserted before the beginning of the cut-in sequence.

In row 24, the frame Ae (column Z) at the beginning of the cut-in sequence is copied/renamed from the field Be (column AB, bold) of the cut-in sequence. This is not an inserted field. It is a "copied-over" field.

In row 25, the cut-out sequence extends from columns Q-W, no frames are inserted, and the cut-in sequence extends from columns X-AI.

In row 25, the frames Ao, Ae (columns W-X) at the end of the cut-out sequence are copied/renamed from the fields Do, De (columns U-V, bold) of the cut-out sequence. These are not inserted fields. They are "copied-over" fields.

FIG. 4A showed 25 possibilities for deleting frames with odd (o) field cuts.

FIG. 4B showed 25 possibilities for inserting frames, with odd (o) field cuts.

For a given one of the 25 situations (rows 1-25), either frames may be deleted or frames may be added. For example, FIG. 4A, rows 1, 19 and 25 show deleting 5 frames to preserve the pull-down sequence. However, rather than deleting 5 frames, it is preferable to add zero frames, using the techniques shown in rows 1, 19 and 25 of FIG. 4B.

Although the invention has been described in connection with various specific embodiments, those skilled in the art will appreciate that numerous adaptations and modifications may be made thereto without departing from the spirit and scope of the invention as set forth in the claims.

The invention claimed is:

1. A method for editing spliced-together video comprising a cut-out sequence followed by a cut-in sequence, each of the cut-out and cut-in sequences being in 3:2 pull-down format, a cut point being defined at the end of the cut-out sequence which is the beginning of the cut-in sequence, the method comprising:

detecting, by a detector, a bad edit wherein the spliced-together video does not preserve the 3:2 pull-down format; and deleting a number of contiguous frames at the end of the cut-out sequence and/or a number of contiguous frames at the beginning of the cut-in sequence in order that the 3:2 pull-down sequence is preserved in the spliced-together video by a controller.

2. A method according to claim 1, wherein:

when two or more frames are deleted, preserving symmetry by deleting frames as equally as possible from both sides of the cut point.

3. A method, according to claim 1, further comprising:

determining a frame type at the end of the cut-out sequence and at the beginning of the cut-in sequence; and determining a number of frames to delete to preserve the pull-down sequence.

4. A method, according to claim 3, wherein there are four frame types, a frame comprises two fields, and further comprising:

when deleting a frame, deleting all fields from each frame type.

5. A method, according to claim 1, further comprising:

when deleting frames, deleting complete frames.

6. A method, according to claim 1, wherein a frame comprises two fields, and further comprising:

ensuring that all frames that straddle the cut point have all their fields originating from the same film frame.

7. A method, according to claim 1, further comprising:

if the frames straddling the cut point do not originate from the same film frame, deleting an entire 5-frame sequence that straddles the cut point.

8. A method, according to claim 1, wherein there are four lettered (A-D) frame types, a frame comprises two fields, and further comprising:

ensuring that all fields for the same frame type come from the same, single original film frame and that each field in a sequence has equal or later temporal reference.

9. A method, according to claim 1, wherein there are four lettered (A-D) frame types, two of which are 2-field frame types, the other two of which are 3-field frame types, and when converting from a 2-field frame type to a 3-field frame type, fields are repeated and the repeat fields contain the same video data.

10. A method, according to claim 1, wherein each frame comprises two fields, there are odd (o) and even (e) field types, and a sequence always has alternating field types.

11. A method for editing spliced-together video comprising a cut-out sequence followed by a cut-in sequence, each of the cut-out and cut-in sequences being in 3:2 pull-down format, comprising:

detecting a bad edit by a detector wherein the spliced-together video does not preserve the pull-down format; and inserting a first number of frames at the end of the cut-out sequence and/or a second number of frames at the beginning of the cut-in sequence in order that the pull-down format is preserved in the spliced-together video by a controller.

12. A method according to claim 11, wherein:

when two or more frames are inserted, preserving symmetry by inserting frames as equally as possible from both sides of the cut point.

13. A method, according to claim 11, further comprising:

determining a frame type at the end of the cut-out sequence and at the beginning of the cut-in sequence; and determining a number of frames to insert to preserve the 3:2 pull-down sequence.

14. A method, according to claim 13, wherein there are four frame types, a frame comprises two fields, and further comprising:

when inserting a frame, inserting all fields from each frame type.

15. A method, according to claim 11, further comprising:

when inserting frames, inserting complete frames.

16. A method, according to claim 11, wherein a frame comprises two fields, and further comprising:

ensuring that all frames that straddle the cut point have all their fields originating from the same film frame.

17. A method, according to claim 11, further comprising:

when a frame straddles a cut point, copying/renaming the last field of the cut-out sequence from a previous field of the cut-out sequence.

18. A method, according to claim 11, further comprising:

when a frame straddles a cut point, copying/renaming the first field of the cut-in sequence from a subsequent field of the cut-in sequence.

19. A method, according to claim 11, wherein there are four lettered (A-D) frame types, a frame comprises two fields, and further comprising:

ensuring that all fields for the same frame type come from the same, single original film frame and that each field in a sequence has equal or later temporal reference.

20. A method, according to claim 11, wherein there are four lettered (A-D) frame types, two of which are 2-field frame types, the other two of which are 3-field frame types, and when converting from a 2-field frame type to a 3-field frame type, fields are repeated and the repeat fields contain the same video data.

21. A method, according to claim 11, wherein each frame comprises two fields, there are odd (o) and even (e) field types, and a sequence always has alternating field types.

* * * * *